(12) United States Patent
Lakshman et al.

(10) Patent No.: US 9,420,305 B2
(45) Date of Patent: Aug. 16, 2016

(54) HYBRID VIDEO DECODER, HYBRID VIDEO ENCODER, DATA STREAM USING A REFERENCE FROM A COMBINATION OF IIR AND FIR FILTERS

(71) Applicants: Haricharan Lakshman, Berlin (DE); Heiko Schwarz, Panketal (DE); Benjamin Bross, Berlin (DE); Thomas Wiegand, Berlin (DE)

(72) Inventors: Haricharan Lakshman, Berlin (DE); Heiko Schwarz, Panketal (DE); Benjamin Bross, Berlin (DE); Thomas Wiegand, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 742 days.

(21) Appl. No.: 13/650,565

(22) Filed: Oct. 12, 2012

(65) Prior Publication Data

US 2013/0039428 A1     Feb. 14, 2013

Related U.S. Application Data

(63) Continuation of application No. PCT/EP2011/055540, filed on Apr. 8, 2011.

(60) Provisional application No. 61/432,917, filed on Jan. 14, 2011.

(30) Foreign Application Priority Data

Apr. 13, 2010 (EP) ..................................... 10159773
Apr. 13, 2010 (WO) ................. PCT/EP2010/054825

(51) Int. Cl.
*H04N 7/32*        (2006.01)
*H04N 19/523*    (2014.01)

(Continued)

(52) U.S. Cl.
CPC ........... *H04N 19/523* (2014.11); *H04N 19/117* (2014.11); *H04N 19/136* (2014.11); *H04N 19/61* (2014.11); *H04N 19/80* (2014.11)

(58) Field of Classification Search
CPC . H04N 19/523; H04N 19/117; H04N 19/136; H04N 19/61; H04N 19/80
See application file for complete search history.

(56) References Cited

U.S. PATENT DOCUMENTS 4,811,263 A *  3/1989  Hedley et al. ................. 708/316
6,567,571 B1 * 5/2003  Kochi et al. ................... 382/312

(Continued)

FOREIGN PATENT DOCUMENTS

EP     1 431 917 A2     6/2004
EP     2 157 799 A1     2/2010

(Continued)

OTHER PUBLICATIONS

Official Communication issued in International Patent Application No. PCT/EP2011/055540, mailed on Oct. 21, 2011.

(Continued)

*Primary Examiner* — Jay Patel
*Assistant Examiner* — Joseph Suh
(74) *Attorney, Agent, or Firm* — Keating & Bennett, LLP

(57) ABSTRACT

A hybrid video decoder has an extractor, a predictor and a reconstructor. The extractor is configured to extract motion information and residual information for a first block of a current picture from a data stream. The predictor is configured to provide, depending on the motion information, a prediction for the block of the current picture by interpolating a reference picture, using a combination of an IIR filter and FIR filter. The reconstructor is configured to reconstruct the current picture at the block using the prediction for the block and the residual information for the block. Furthermore, a hybrid video encoder, a data stream, a method for encoding a video and a method for decoding a video are described.

45 Claims, 13 Drawing Sheets

(51) Int. Cl.
*H04N 19/61* (2014.01)
*H04N 19/117* (2014.01)
*H04N 19/136* (2014.01)
*H04N 19/80* (2014.01)

(56) References Cited

U.S. PATENT DOCUMENTS

| | | | |
|---|---|---|---|
| 6,577,259 B1* | 6/2003 | Jelonnek | 341/143 |
| 2001/0016010 A1* | 8/2001 | Kim | 375/240.25 |
| 2001/0046264 A1* | 11/2001 | Fandrianto et al. | 375/240.16 |
| 2002/0012071 A1* | 1/2002 | Sun | 348/578 |
| 2002/0141503 A1* | 10/2002 | Kobayashi et al. | 375/240.27 |
| 2002/0149685 A1* | 10/2002 | Kobayashi et al. | 348/252 |
| 2003/0142234 A1* | 7/2003 | Dent | 348/554 |
| 2003/0202665 A1* | 10/2003 | Lin et al. | 381/17 |
| 2003/0223505 A1* | 12/2003 | Verbin et al. | 375/261 |
| 2004/0057517 A1* | 3/2004 | Wells | 375/240.16 |
| 2004/0264576 A1* | 12/2004 | Woods et al. | 375/240.24 |
| 2005/0030393 A1* | 2/2005 | Tull | 348/241 |
| 2005/0196072 A1* | 9/2005 | Zhong | 382/298 |
| 2005/0196073 A1 | 9/2005 | MacInnis et al. | |
| 2006/0149532 A1* | 7/2006 | Boillot et al. | 704/203 |
| 2007/0071095 A1* | 3/2007 | Lim | 375/240.08 |
| 2007/0094317 A1* | 4/2007 | Wang | 708/290 |
| 2007/0200857 A1* | 8/2007 | Scheuermann | 345/502 |
| 2008/0062327 A1* | 3/2008 | MacInnis et al. | 348/701 |
| 2008/0155000 A1* | 6/2008 | Mehrseresht et al. | 708/290 |
| 2011/0103464 A1* | 5/2011 | Zheng et al. | 375/240.02 |

FOREIGN PATENT DOCUMENTS

| | | | | |
|---|---|---|---|---|
| KR | 20090114923 A | * | 11/2009 | G06F 7/00 |
| WO | 2009/151563 A1 | | 12/2009 | |

OTHER PUBLICATIONS

Girod, "Motion-Compensating Prediction with Fractional-Pel Accuracy," IEEE Transactions on Communications, vol. 41, No. 4, Apr. 1993, pp. 604-612.

Sullivan et al.,"Meeting Report of the First Meeting of the Joint Collaborative Team on Video Coding," JCT-VC of ITU-T SG16 WP3 and ISO/IEC JTC1/SC29/WG11 , Apr. 15-23, 2010, 57 pages.

Marpe et al., "Video Compression Using Nested Quadtree Structures, Leaf Merging, and Improved Techniques for Motion Representation and Entropy Coding," IEEE Transactions on Circuits and Systems for Video Technology, vol. 20, No. 12, Dec. 2010, pp. 1676-1687.

Winken et al., "Description of Video Coding Technology Proposal by Fraunhofer HHI," JCT-VC of ITU-T SG16 WP3 and ISO/IEC JTC1/SC29/WG11, Apr. 15-23, 2010, 44 pages.

Lakshman et al., "Fractional-Sample Motion Compensation Using Generalized Interpolation," 28th Picture Coding Symposium, Dec. 8-10, 2010, pp. 530-533.

* cited by examiner

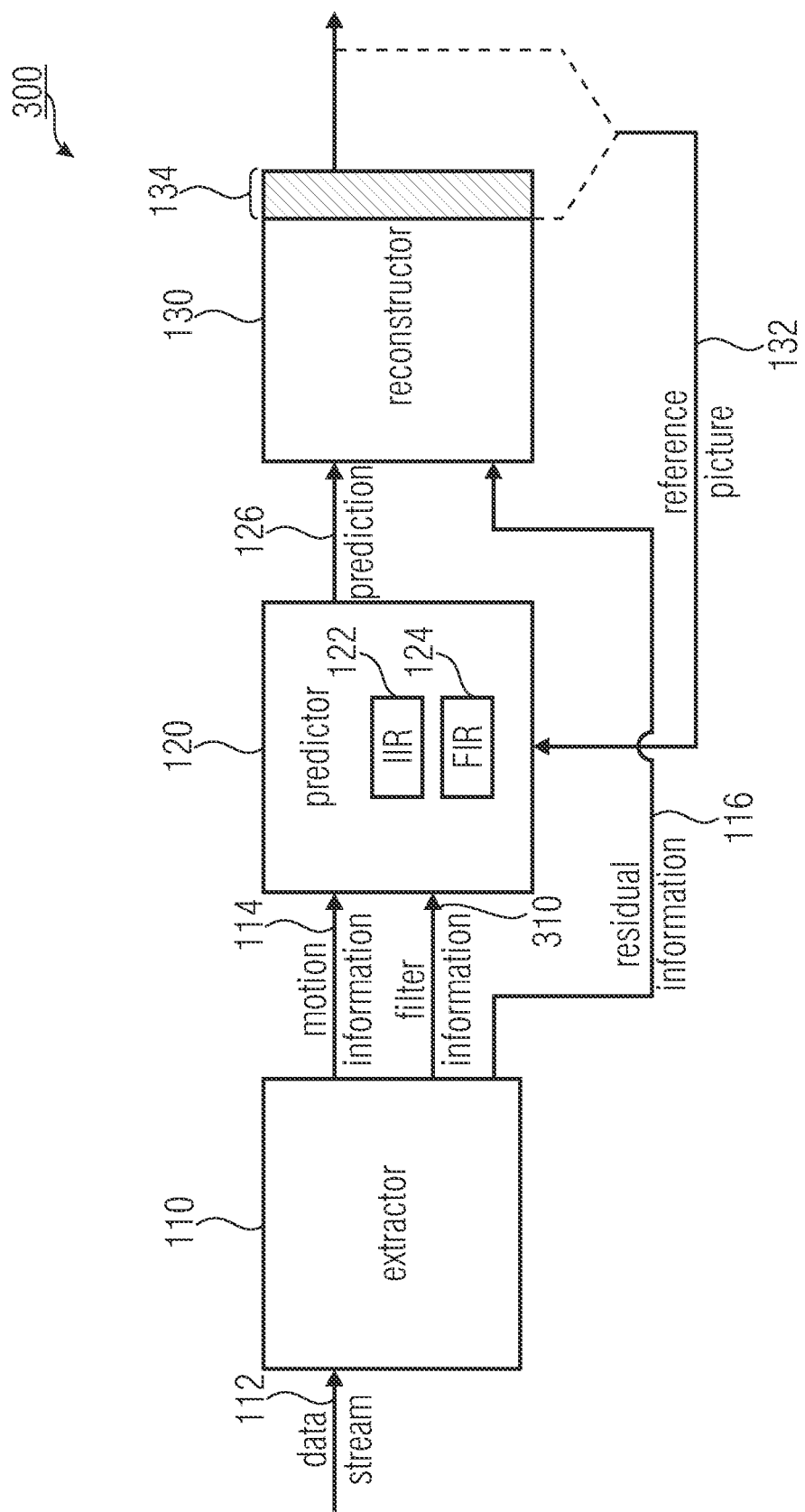

HYBRID VIDEO DECODER, HYBRID VIDEO ENCODER, DATA STREAM USING A REFERENCE FROM A COMBINATION OF IIR AND FIR FILTERS

CROSS-REFERENCE TO RELATED APPLICATIONS

This application is a continuation of copending International Application No. PCT/EP2011/055540, filed Apr. 8, 2011, which is incorporated herein by reference in its entirety, and additionally claims priority from International Application No. PCT/EP2010/054825, filed Apr. 13, 2010, from European Application No. EP 10159773.0, filed Apr. 13, 2010 and from U.S. Provisional Application No. 61/432,917, filed Jan. 14, 2011, all of which are incorporated herein by reference in their entirety.

BACKGROUND OF THE INVENTION

Embodiments of the present invention relate to a hybrid video decoder. Further embodiments of the present invention relate to a hybrid video encoder, a data stream, a method for decoding a video and a method for encoding a video.

In the conventional or state-of-the-art (hybrid) video coding, the components of a video frame are predicted either by motion compensated prediction, using the reconstructed components of previous pictures, or by intra prediction, using previously reconstructed blocks of the same picture (see, for example, Thomas Wiegand, Gary J. Sullivan, Gisle Bjontegaard, and Ajay Luthra Overview of the H.264/AVC Video Coding Standard, IEEE Tran. on Circuits and Systems for Video Technology, Vol. 13, No. 7, pp. 560-576, July 2003). For example, if a video frame is represented using YUV color space, the components of the video frames are the three Y, U and V color components. The residual signal, i.e. the difference between the original components and the corresponding prediction signals, is usually coded using transform coding (a combination of a decorrelating transform, quantization of transform coefficients, and entropy coding of the resulting quantization symbols). When the picture is comprised of multiple components (planes), the prediction can either be done separately or can be grouped by sharing the prediction information (plane grouping). Motion compensated prediction can be done for some sub-regions of a picture (see, for example, Thomas Wiegand, Markus Flierl, and Bernd Girod: Entropy-Constrained Design of Quadtree Video Coding Schemes, Proc. 6th IEE Intern. Conf. on Image Processing and its Applications, Dublin, Ireland, July 1997.2). Usually, the sub-regions are rectangular blocks of samples. But it is also conceptually possible to use the same motion parameters for an arbitrary set of samples. The motion parameters are included in the bitstream and transmitted to the decoder. It is possible to use arbitrary motion models. Commonly, the motion is modeled using a translational motion model, in which case a motion vector (2 parameters) specifying a displacement is transmitted for each region. Other common motion models include the affine motion model (6 parameters), 3-, 4-, and 8-parameter models. The motion parameters can be transmitted with arbitrary accuracy. For example, for the translational motion model, the motion vectors could be coded using full-sample accuracy or sub-sample accuracy (e.g. quarter-sample accuracy). In the first case, the prediction samples can be directly copied from the reconstructed pictures. In the case of sub-sample accurate motion vectors (or general motion parameters), the prediction samples are interpolated using the reconstructed samples. The state-of-the-art sub-sample generation methods for motion compensated prediction use FIR filtering. Recently, adaptive FIR filters (see, for example, Thomas Wedi, Adaptive Interpolation Filter for Motion Compensated Hybrid Video Coding, Proc. Picture Coding Symposium (PSC 2001), Seoul, Korea, April 2001) were proposed for improved motion compensated prediction. Any of the previously transmitted pictures can be used for motion compensation (see, for example, Thomas Wiegand, Xiaozheng Zhang, and Bernd Girod Long-Term Memory Motion-Compensated Prediction, IEEE Transactions on Circuits and Systems for Video Technology, Vol. 9, No. 1, pp. 70-84, February 1999). If the reference picture is not fixed by high-level parameters, reference indices can be transmitted to identify the used reference pictures. It is also possible to modify the prediction signal using a weighting factor and an offset (often referred to as weighted prediction), or any other weighting function to obtain the final prediction signal. Furthermore, several prediction signals can be combined to obtain the final prediction signal. This is often referred to as multi-hypothesis prediction (see, for example, Sullivan, G.; Multi-hypothesis motion compensation for low bit-rate video coding, IEEE International Conference on Acoustics, Speech and Signal Proc. Vol. 5, 1993). The combined prediction signal can, for example, be obtained by a weighted sum of different prediction signals. The individual prediction signals can stem from same or different upsampled reference pictures. If two prediction signals are combined, the multi-hypotheses prediction is also referred to as bi-prediction (as supported in B-slices of modern video coding standards). It is, however, also possible to use more than two hypotheses. The entropy coding of the quantized transform coefficients can be done, for example, by variable-length coding or (adaptive) arithmetic coding (see, for example, Detlev Marpe, Heiko Schwarz, and Thomas Wiegand: Context-Based Adaptive Binary Arithmetic Coding in the H264/AVC Video Compression Standard, IEEE Tran. on Circuits and Systems for Video Technology, Vol. 13, No. 7, pp. 620-636, July 2003).

However, in hybrid video coding, there is a desire to improve a compression efficiency of the transmitted information.

SUMMARY

According to an embodiment, a hybrid video decoder may have: an extractor configured to extract motion information and residual information for a first block of a current picture from a data stream; a predictor configured to provide, depending on the motion information for the first block of the current picture, a prediction for the first block of the current picture by interpolating a reference picture, using a combination of an IIR filter and FIR filter; and a reconstructor configured to reconstruct the current picture at the first block using the prediction and the residual information for the first block of the current picture.

According to another embodiment, a hybrid video encoder may have: an upsampler configured to upsample a reference picture at sub-sample resolution using a combination of an IIR filter and an FIR filter to obtain an upsampled version of the reference picture; a predictor configured to determine a motion compensated prediction for a first block of a current picture, corresponding to a motion information for the first block of the current picture, using the upsampled version of the reference picture; a residual information determiner, configured to determine a residual information for the first block of the current picture using the motion compensated prediction for the first block of the current picture and the block of the current picture; and a data stream inserter configured to insert the motion information and the residual information for the first block of the current picture into a data stream.

Another embodiment may have a data stream having motion information, residual information and IIR filter information for a block of a current picture.

According to another embodiment, a method for decoding a video may have the steps of: extracting motion information and residual information for a block of a current picture from a data stream; providing, depending on the motion information, a prediction for the block of the current picture by interpolating a reference picture, using a combination of an IIR filter and FIR filter; and reconstructing the current picture at the block using the prediction for the block and the residual information for the block.

According to another embodiment, a method for encoding a video may have the steps of: upsampling a reference picture at sub-pixel resolution, using a combination of an IIR filter and FIR filter to obtain an upsampled version of the reference picture; determining a motion compensated prediction for a block of a current picture, corresponding to a motion information for the block of the current picture, using the upsampled version of the reference picture; determining a residual information for the block of the current picture using the motion compensated prediction for the block of the current picture and the block of the current picture; and inserting the motion information and the residual information for the block of the current picture into a data stream.

According to another embodiment, a hybrid video decoder may have: an extractor configured to extract motion information and residual information for a first block of a current picture from a data stream; a predictor configured to provide, depending on the motion information for the first block of the current picture, a prediction for the first block of the current picture by interpolating a reference picture, using a combination of an IIR filter and FIR filter; wherein a pole value p of the IIR filter chosen to be $$p=-2^{-N_1}-2^{-N_2}\ldots -2^{-N_m};$$

wherein $N_1 > N_2 > \ldots > N_m$; wherein $N_1, N_2, \ldots, N_m$ are natural numbers larger 0; wherein a filter parameter of the FIR filter is chosen such that deviations of IIR filtered values at full pixel positions of the reference picture compared to their associated values in the reference picture before interpolating are reduced by the FIR filter at least by 50%; and a reconstructor configured to reconstruct the current picture at the first block using the prediction and the residual information for the first block of the current picture.

According to another embodiment, a hybrid video encoder may have: an upsampler configured to upsample a reference picture at sub-sample resolution using a combination of an IIR filter and FIR filter to obtain an upsampled version of the reference picture; wherein a pole value p of the IIR filter is chosen to be $$p=-2^{-N_1}-2^{-N_2}\ldots -2^{-N_m};$$

wherein $N_1 > N_2 > \ldots > N_m$; wherein $N_1, N_2, \ldots, N_m$ are natural numbers larger 0; wherein a filter parameter of the FIR filter is chosen such that deviations of IIR filtered values at full pixel positions of the reference picture compared to their associated values in the reference picture before interpolating are reduced by the FIR filter at least by 50%; and a predictor configured to determine a motion compensated prediction for a first block of a current picture, corresponding to a motion information for the first block of the current picture, using the upsampled version of the reference picture; a residual information determiner, configured to determine a residual information for the first block of the current picture using the motion compensated prediction for the first block of the current picture and the block of the current picture; and a data stream inserter configured to insert the motion information and the residual information for the first block of the current picture into a data stream.

According to another embodiment, a method for decoding a video may have the steps of: extracting motion information and residual information for a block of a current picture from a data stream; providing, depending on the motion information, a prediction for the block of the current picture by interpolating a reference picture, using a combination of an IIR filter and FIR filter; wherein a pole value p of the IIR filter is chosen to be $$p=-2^{-N_1}-2^{-N_2}\ldots 2^{-N_m};$$

wherein $N_1 > N_2 > \ldots > N_m$; wherein $N_1, N_2, \ldots, N_m$ are natural numbers larger 0; wherein a filter parameter of the FIR filter is chosen such that deviations of IIR filtered values at full pixel positions of the reference picture compared to their associated values in the reference picture before interpolating are reduced by the FIR filter at least by 50%; and reconstructing the current picture at the block using the prediction for the block and the residual information for the block.

According to another embodiment, a method for encoding a video may have the steps of: upsampling a reference picture at sub-pixel resolution, using a combination of an IIR filter and FIR filter to obtain an upsampled version of the reference picture; wherein a pole value p of the IIR filter is chosen to be $$p=-2^{-N_1}-2^{-N_2}\ldots 2^{-N_m};$$

wherein $N_1 > N_2 > \ldots > N_m$; wherein $N_1, N_2, \ldots, N_m$ are natural numbers larger 0; wherein a filter parameter of the FIR filter is chosen such that deviations of IIR filtered values at full pixel positions of the reference picture compared to their associated values in the reference picture before interpolating are reduced by the FIR filter at least by 50%; determining a motion compensated prediction for a block of a current picture, corresponding to a motion information for the block of the current picture, using the upsampled version of the reference picture; determining a residual information for the block of the current picture using the motion compensated prediction for the block of the current picture and the block of the current picture; and inserting the motion information and the residual information for the block of the current picture into a data stream.

According to another embodiment, a hybrid video decoder may have: an extractor configured to extract motion information and residual information for a first block of a current picture from a data stream; a predictor configured to provide, depending on the motion information for the first block of the current picture, a prediction for the first block of the current picture by interpolating a reference picture, using an FIR filter formed by a combination of a B-Spline function and at least one B-Spline function derivative; and a reconstructor configured to reconstruct the current picture at the first block using the prediction and the residual information for the first block of the current picture.

According to another embodiment, a hybrid video encoder may have: an upsampler configured to upsample a reference picture at sub-sample resolution using an FIR filter formed by a combination of a B-Spline function and at least one B-Spline function derivative to obtain an upsampled version of the reference picture; a predictor configured to determine a motion compensated prediction for a first block of a current picture, corresponding to a motion information for the first block of the current picture, using the upsampled version of the reference picture; a residual information determiner, configured to determine a residual information for the first block of the current picture using the motion compensated prediction for the first block of the current picture and the block of the current picture; and a data stream inserter configured to insert the motion information and the residual information for the first block of the current picture into a data stream.

According to another embodiment, a method for decoding a video may have the steps of: extracting motion information and residual information for a block of a current picture from a data stream; providing, depending on the motion information, a prediction for the block of the current picture by interpolating a reference picture, using an FIR filter formed by a combination of a B-Spline function and at least one B-Spline function derivative; and reconstructing the current picture at the block using the prediction for the block and the residual information for the block.

According to another embodiment, a method for encoding a video may have the steps of: upsampling a reference picture at sub-pixel resolution, using an FIR filter formed by a combination of a B-Spline function and at least one B-Spline function derivative to obtain an upsampled version of the reference picture; determining a motion compensated prediction for a block of a current picture, corresponding to a motion information for the block of the current picture, using the upsampled version of the reference picture; determining a residual information for the block of the current picture using the motion compensated prediction for the block of the current picture and the block of the current picture; and inserting the motion information and the residual information for the block of the current picture into a data stream.

Another embodiment may have a computer readable digital storage medium having stored thereon a computer program having a program code for performing, when running on a computer, the methods of decoding and the methods for encoding mentioned above.

Some embodiments of the present invention provide a hybrid video decoder. The hybrid video decoder comprises an extractor configured to extract motion information and residual information for a block of a current picture from a data stream. The hybrid video decoder further comprises a predictor, which is configured to provide, depending on the motion information, a prediction for the block of the current picture by interpolating a reference picture, using a combination of an Infinite Impulse Response (IIR) filter and a Finite Impulse Response (FIR) filter. The hybrid video decoder further comprises a reconstructor configured to reconstruct the current picture at the block using the prediction for the block and the residual information for the block.

Further embodiments of the present invention provide a hybrid video encoder. The hybrid video encoder comprises an upsampler configured to upsample a reference picture at sub-sample resolution by using a combination of an IIR filter and an FIR filter to obtain an upsampled version of the reference picture. The hybrid video encoder further comprises a predictor, which is configured to determine a motion compensated prediction for a block of a current picture, corresponding to a motion information for the block of the current picture, by using the upsampled version of the reference picture. The hybrid video encoder further comprises a residual information determiner, which is configured to determine a residual information for the block of the current picture by using the motion compensated prediction for the block of the current picture and the block of the current picture. The hybrid video encoder further comprises a data stream inserter configured to insert the motion information for the block of the current picture and the residual information for the block of the current picture into a data stream.

It is an idea of the present invention that a compression efficiency in hybrid video coding can be improved if an IIR filter is used in combination with an FIR filter to interpolate the reconstructed samples or pictures to obtain the upsampled reference samples or reference pictures. It has been found that if there is a combination of an IIR filter and an FIR filter, a more accurate estimation of signal values from upsampled reference pictures can be achieved. This improved upsampling can significantly reduce a motion compensated prediction error. Hence, the resulting video signal (i.e. for example, the quantized transform coefficients) representing the prediction residual can be represented at a better rate/distortion compromise compared to the case where only an FIR filter is used for upsampling the reconstructed pictures to obtain the upsampled reference pictures.

Compared to the upsampling systems solely relying on FIR filters, embodiments of the present invention can provide a sharp cut-off in frequency response of the overall upsampling system even when employing compactly supported FIR filter kernels. On the one hand, embodiments can provide frequency responses that are difficult or impossible to realize with an FIR only system. On the other hand, a significant decrease in complexity can be achieved with embodiments of the present invention compared to an FIR only system for similar frequency responses.

According to some embodiments of the present invention, a predictor of a hybrid video decoder may be configured to interpolate the reference picture, such that the reference picture is filtered with the IIR filter to obtain an IIR filtered version of the reference picture. The FIR filter is then applied to the IIR filtered version of the reference picture to obtain the prediction for the block of the current picture. In other words, the IIR filter may be a pre-filter and may be designed to preserve the resolution of the reference picture, the FIR filter may be a post-filter or a post-interpolation filter for the IIR filtered samples of the reference picture.

According to further embodiments, a hybrid video encoder may further comprise a reconstructor, which is configured to obtain the reference picture as a reconstructed version of a previously encoded picture.

BRIEF DESCRIPTION OF THE DRAWINGS

Embodiments of the present invention will be explained below in more detail with reference to the accompanying Figs., wherein:

FIG. 2b shows a block diagram of an upsampler which may be used in the hybrid video decoder from FIG. 2a;

FIG. 3 shows a block diagram of a hybrid video decoder according to a further embodiment of the present invention;

DETAILED DESCRIPTION OF THE INVENTION

Figure 1:
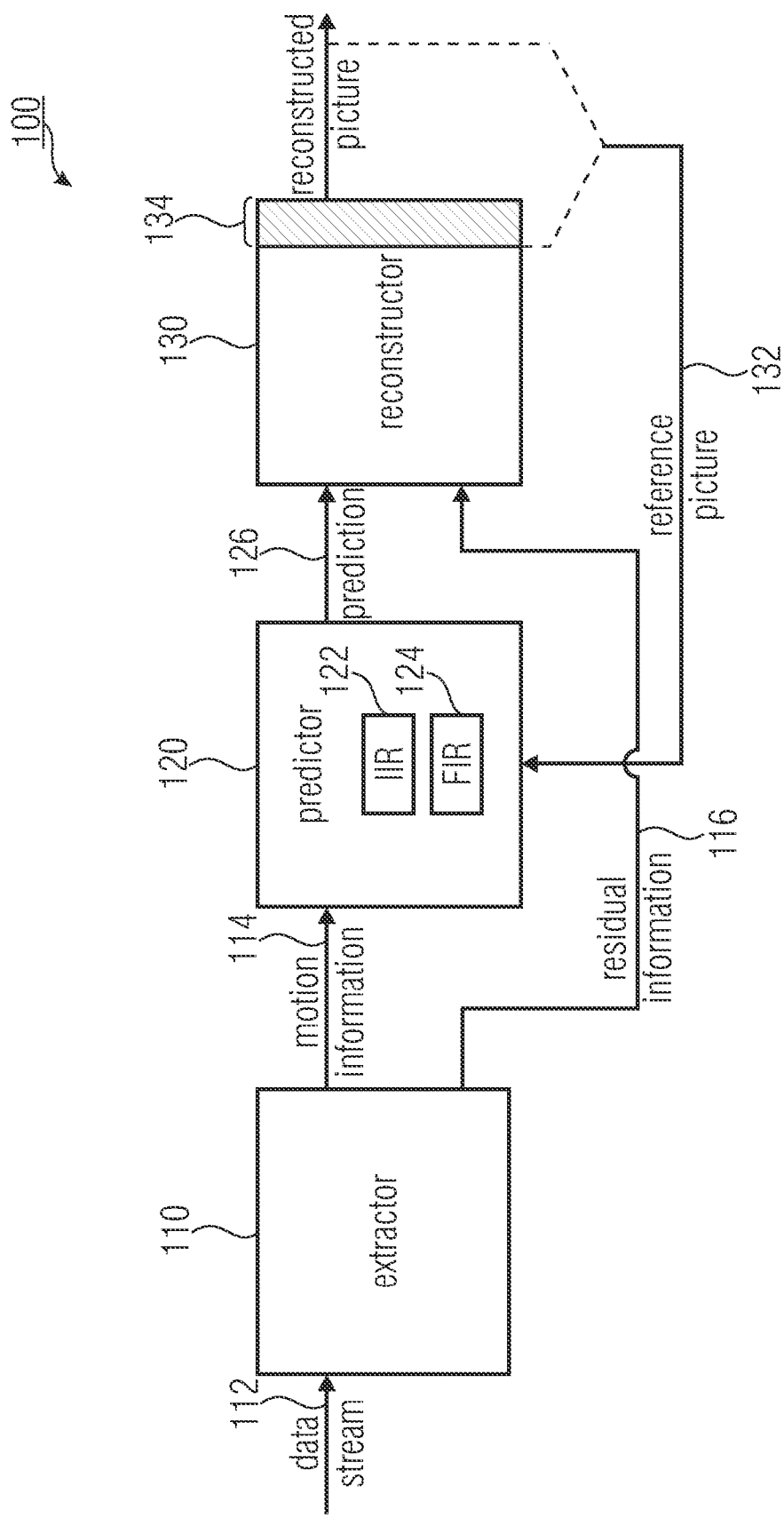
FIG. 1 shows a block diagram of a hybrid video decoder according to an embodiment of the present invention.

Before embodiments of the present invention will be explained in greater detail in the following on the basis of the Figs., it is to be pointed out that the same or functionally equal elements are provided with the same reference numerals in the Figs. and that a repeated description of these elements shall be omitted. Hence, the description of the elements provided with the same reference numerals is mutually interchangeable and/or applicable in the various embodiments.

FIG. 1 shows a block diagram of a hybrid video decoder 100. The hybrid video decoder 100 comprises an extractor 110, a predictor 120 and a reconstructor 130. The predictor 120 comprises an IIR filter 122 and an FIR filter 124. The extractor 110 is configured to extract motion information 114 and residual information 116 for a block of a current picture from a data stream 112. The predictor 120 is configured to provide, depending on the motion information 114, for the block of the current picture, a prediction 126 for the block of the current picture. The predictor 120 is configured to provide the prediction 126 by interpolating a reference picture 132 by using a combination of the IIR filter 122 and the FIR filter 124. The reconstructor 130 is configured to reconstruct the current picture at the block using the prediction 126 for the block and the residual information 116 for the block of the current picture.

The data stream 112 comprises the motion information 114 for the block of the current picture and the residual information 116 for the block of the current picture and may further comprise additional side information. The motion information 114 and the residual information 116 may be coded using entropy coding. The residual information 116 may be coded within a transform domain, i.e. in a spectrally decomposed way. The motion information 114 may determine a motion vector, for example, with two parameters, one parameter for the horizontal direction and one parameter for the vertical direction of the block of the current picture. Alternatively, the motion information 114 may be based on a higher order motion model, examples of which have been mentioned in the introductory portion of the application. A precision of the motion information 114 may be arbitrary. In the case of a sub-sample resolution, which means the motion information 114 are defined in units smaller than a sample pitch of the reference picture 132, the reference picture 132 has to be interpolated (using the combination of the IIR filter 122 and the FIR filter 124). The predictor 120 provides, as mentioned before, based on the motion information 114 and the reference picture 132 which, for example, is a reconstructed picture of a previously encoded picture, the prediction 126 for the block of the current picture. The residual information 116, which is also comprised in the data stream 112, determines the quantized difference between the prediction 126 for the block of the current picture and the original version of the block of the current picture. The higher the similarity between the prediction 126 for the block of the picture and the block of the picture is, the smaller is the residual information 116 for the block of the current picture. A smaller residual information 116 results in a lower complexity of the residual information 116 in the data stream 112, and can be represented by fewer bits in the data stream 112. As mentioned before, embodiments of the present invention may achieve a more accurate estimation of signal values of upsampled reference pictures (of the reference picture 132) by using the combination of the IIR filter 122 and the FIR filter 124. The improved upsampling of the reference picture 132 significantly reduces the motion compensated prediction error and, therefore, reduces the information, which is to be transmitted within the residual information 116. The predictor 120 may, therefore, be capable of obtaining an improved prediction 126 for the block of the current picture, than merely using FIR filtering, because of the improved upsampling of the reference picture 132. The improvement in the upsampling of the reference picture 132 is caused by the sharp cut-off frequency response possible with IIR filters of moderate number of filter taps, because of the combination of the IIR filter 122 and the FIR filter 124. The computational load is not significantly increased especially when considering that for a similar frequency response, as obtainable by the combination of the IIR filter 122 and the FIR filter 124, a much more complex FIR only system would need to be employed involving a higher number of FIR filter taps.

A sample of a block of a picture or of a picture may for example be a pixel of the block or of the picture.

The reconstructor 130 may comprise a filtering part 134, which, for example, performs a rounding or clipping of the values of the reconstructed picture, for example, to be displayable on a display. The reference picture 132 may be the reconstructed picture or an unclipped or unfiltered version of the reconstructed picture, for example, if a bit resolution of the residual information 116 and the prediction 126 is higher than a bit resolution of the reconstructed picture.

Figure 2A:
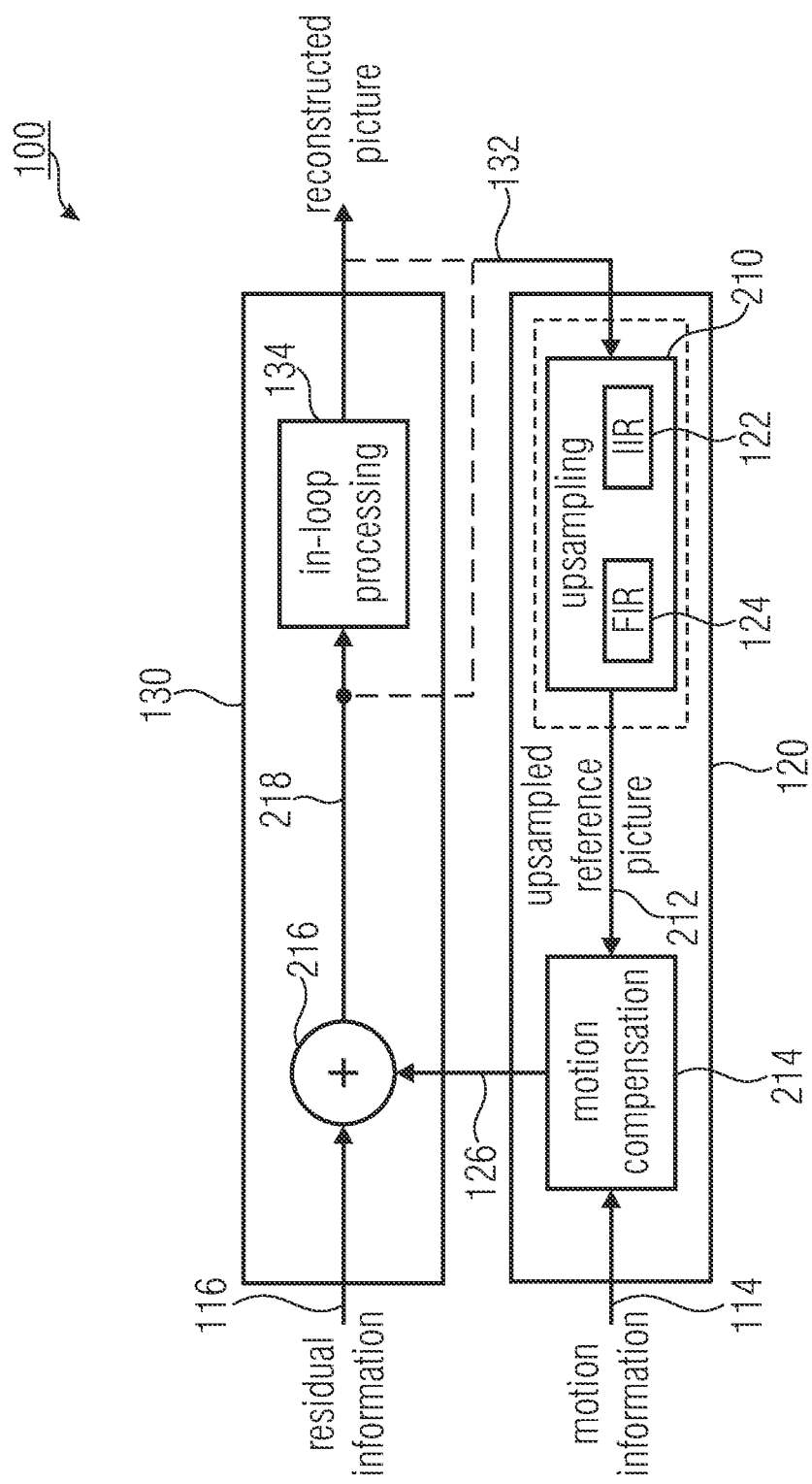
FIG. 2a shows a block diagram of a hybrid video decoder according to an embodiment of the present invention.

FIG. 2a shows a block diagram of portions of the hybrid video decoder 100 of FIG. 1 in more details. In FIG. 2a, the extractor 110 of the hybrid video decoder 100 is not shown. The block diagram in FIG. 2a shows that the predictor 120 may be split into a motion compensation block 214 and an upsampler 210. The reconstructor 130 may be split into a prediction and residual information combiner 216 and an in-loop processing block 134. As mentioned before, the reference picture 132 may be the reconstructed picture, for example, after clipping, filtering or rounding in the in-loop processing block 134 or may be a high bit depth or bit resolution version 218 of the reconstructed picture, which may be obtained directly from the prediction and residual information combiner 216. The high resolution version 218 of the reconstructed picture may in the following also be called high bit resolution reconstructed picture 218.

The reference picture 132 is fed into the upsampler 210, where an upsampling is performed by using the combination of the IIR filter 122 and the FIR filter 124 to determine an upsampled reference picture 212. An upsampled reference picture may in the following also be called an upsampled version of the reference picture. In other words, the upsampled reference picture 212 is generated by upsampling the reference picture 132 which may be a reconstructed picture or a high bit resolution version 218 of the reconstructed picture. Therefore, the upsampled reference picture 212 is a spatially upsampled version of a previously decoded picture (the reference picture 132, which has been decoded earlier) to which the motion information 114 of the block of the current picture refers. The motion compensation block 214, applies the motion information 114 for the block of the current picture to the upsampled reference picture 212 (which is an upsampled version of a previously decoded picture) to determine the prediction 126 for the block of the current picture. The prediction 126 is then fed into the prediction and residual information combiner 216 to obtain the high resolution reconstructed picture 218 (of the current picture). As outlined in more detail below, the stage of upsampling using the combination of the IIR filter 122 and the FIR filter 124 and applying the motion information 114 may be integrated into one interpolation step where upsampling takes place merely at sub sample positions defined by the motion information 114. After the in-loop processing of the high resolution reconstructed picture 218 in the in-loop processing block 134 to obtain the reconstructed (current) picture, the picture may be fed to a picture output device, for example a display. The reconstructed picture or the high resolution reconstructed picture 218 may then also be used as a reference picture 132 for subsequent following pictures.

As mentioned before, the motion information 114 and the residual information 116 may correspond to a certain block of the current picture. Therefore, the motion compensation in the motion compensation block 214 may be performed for the corresponding block of the current picture. Hence, the prediction 126 also corresponds to the block of the current picture, such that the prediction and residual information combiner 216 combines each prediction 126 and each residual information 116 for each block of the current picture to obtain the high bit resolution reconstructed picture 218. A block of pictures may, for example, be a square shape or an arbitrary shape. A block may, for example, contain 16×16 samples, 8×8 samples or 4×4 samples or 16×8 samples or another arbitrary value. Especially, sizes of different blocks of the current picture may differ within the current picture.

Figure 2B:
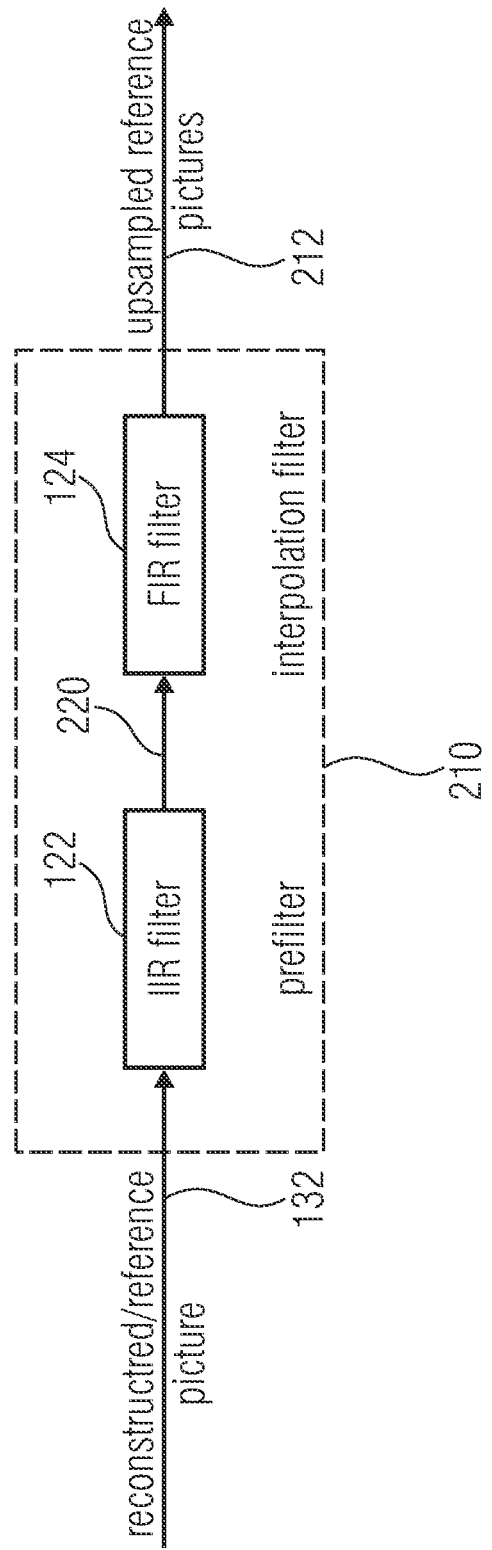

FIG. 2b shows a block diagram of an upsampler 210, which may be used in the hybrid video decoder 100 according to FIG. 2a. According to some embodiments, the IIR filter 122 may be a pre-filter preceding the FIR filter 124 with the latter performing the actual interpolation, as it is shown in FIG. 2b. In other words, embodiments of the present invention employ an IIR filter 122 (denoted in FIG. 2b as pre-filter) in combination with an FIR filter 124 (denoted in FIG. 2b as interpolation filter). In other words, the IIR filtering with the IIR filter 122 of the reference picture 132 to yield an IIR filtered version 220 of the reference picture 132 may be performed as an initial step. The FIR filter 124 is then applied after the initial step to the IIR filtered version 220 of the reference picture 132.

Assuming a size of the reference picture 132 of W×H, a size of the IIR filtered version 220 of the reference picture 132 would also be W×H. Therefore, due to the fact that the spatial resolution does not change and that IIR filtering enables a direct manipulation of samples during filtering, no additional memory is necessitated for saving the IIR filtered version 220 of the reference picture 132. A size of the upsampled reference picture 212 (which contains values at upsampled sample positions of the IIR filtered version 220 of the reference picture 132) may be M×N, which is greater than the size of the reference picture 132 or of the IIR filtered version 220 of the reference picture 132.

In general, a value at an upsampled sample position may be a value of an original sample of an original picture at a sample position of the original picture, which has been interpolated or is the same as in the original picture (if the value hasn't been interpolated) or may be a value in between original samples of the original picture, which has been interpolated at a sub-sample position regarding the original picture.

The size of the upsampled reference picture 212 may be dependent on a resolution of the motion information 114. Assuming a resolution of a translatory motion information 114 of one-fourth sample accuracy, up to four upsampled sample positions have to be calculated for each sample position of the reference picture 132 by the FIR filter 124 to determine the upsampled reference picture 212. Assuming a reference picture size of 4×4 samples, a size of the complete upsampled reference picture 212 would be at least 16×16 samples.

According to further embodiments the FIR filter 124 may be configured such that values of samples at sample positions (so called integer pixel values) of the upsampled reference picture 212 are not calculated or interpolated. In the upsampled reference picture 212 these values would be the same as in the reference picture 132.

Furthermore, the FIR filter 124 may be configured to decide whether the integer pixel values of the upsampled reference picture 212 are calculated/interpolated or not, for example based on motion compensation, blur or luminance change, etc. If they are calculated they may differ from the sample values in the reference picture 132.

According to some embodiments, the FIR filter 124 may be applied on-the-fly. This means that the FIR filtering of samples of the IIR filtered version 220 of the reference picture 132 using the FIR filter 124 can be done upon demand i.e. when motion compensated prediction (the motion compensation block 214) tries to access one or more particular sample(s) in the upsampled reference picture 212 determined by the motion information 114. This can result in memory and complexity reduction for the upsampling process (in the upsampler 210).

Therefore, the performing of the FIR filtering with the FIR filter 124 only when a particular reference picture sample needs to be accessed only necessitates the storage of the IIR filter output (the IIR filtered version 220 of the reference picture 132), which is the size of W×H (the same size as the reference picture 132). Compared there to, generating the whole upsampled reference picture 212 in advance would necessitate the storage of the FIR filter output (the complete upsampled reference picture 212), which is the size of M×N. The memory requirements for the case of the on-the-fly FIR filtering would be independent of the upsampling factor (and especially independent on the resolution of the motion information 114). Generally, the upsampled reference picture size M×N is greater than the reconstructed picture size W×H. Therefore, storing only the IIR filtered version 220 of the reference picture 132 would result in memory savings. Additionally, by only computing chosen samples of the upsampled reference picture 212, the FIR filter 124 performing on-the-fly FIR filtering would consume less time than an FIR filter performing a complete FIR filtering of a reference picture 132. Therefore, on-the-fly FIR filtering does not only lead to memory savings, but also to time savings and complexity reductions.

In a decoder (such as the hybrid video decoder 100), generally only a subset of samples of the upsampled reference picture 212 are accessed for computing the motion compensated prediction 126. In such a scenario, the complexity due to FIR filtering of the IIR filtered version 220 of the reference picture 132 to generate samples of the upsampled reference picture 212 that are not accessed can be saved when performing on-the-fly filtering. This results in a saving of memory and time.

In other words, the predictor 120 (which comprises the IIR filter 122 and the FIR filter 124) is configured to selectively apply the FIR filter 124 to the IIR filtered version 220 of the reference picture 132 depending on the motion information 114. The predictor 120 interpolates the IIR filtered version 220 of the reference picture 132, therefore, at only a subset of (possible) upsampled sample positions (of the upsampled reference picture 212). This subset is determined, as mentioned before, by the motion information 114.

As an example, assuming a block of a reference picture 132 with four samples A (0; 0), B (1; 0), C (0; 1) and D (1; 1) and a motion information 114 (or a so-called motion vector) m (0.5; 0.25) with an accuracy of one-fourth sample for a first block of a current picture referencing the block of the reference picture 132.

With an FIR filter, which is not performing on the fly FIR filtering up to four sample positions of upsampled reference picture 212 need to be calculated. For example, between A and B, the positions (0; 0), (0.25; 0), (0.5; 0) and (0.75; 0) would need to be calculated. This has to be done for all the sample positions of the block of the reference sample 132 to determine an upsampled version of the block of the reference picture 132.

By using an FIR filter 124 performing on-the-fly FIR filtering, only a first subset of the upsampled sample positions of the upsampled reference picture 212 needs to be calculated. Referring to the example, only the upsampled sample positions a (0.5; 0.25), b (1.5; 0.25), c (0.5; 1.25) and d (1.5; 1.25) need to be calculated to obtain the prediction 126 for the first block.

For obtaining a further prediction for a further block of the current picture such as, for example, a neighboring block of the first block of the current picture, the FIR filter 124 may be applied anew to the IIR filtered version 220 of the reference picture 132 depending on further motion information for the further block. The further motion information for the further block may differ from the motion information 114 from the first block and, therefore, the IIR filtered version 220 of the reference picture 132 is interpolated at a further subset of the upsampled sample positions of the upsampled reference picture 212. The further subset is determined by the further motion information 114 of the further block of the current picture. The first subset for the first block may overlap with the further subset for the further block. In other words, according to some embodiments, the predictor 120 may be configured to, in providing a prediction for another block of the current picture, depending on a further motion information, selectively apply the FIR filter 124 to the IIR filtered version 220 of the reference picture 132 anew. The FIR filter 124 is applied depending on the further motion information to interpolate the IIR filtered version 220 of the reference picture 132 at the further subset of upsampled sample positions. As mentioned before, the further subset of the upsampled sample positions is determined by the further motion information. The further subset may at least partially overlap with a subset of upsampled sample positions calculated for another preceding block of the current picture. This means, during the interpolation for the first block of the current picture, only a subset of upsampled sample positions of the upsampled reference picture 212 are calculated. For the further prediction for the further block of the current picture more upsampled sample positions of the upsampled reference picture 212 are calculated, which are creating the further subset, which may at least partially overlap with the first subset.

FIG. 3 shows a block diagram of a hybrid video decoder 300 according to an embodiment of the present invention. The hybrid video decoder 300 shown in FIG. 3 differs from the hybrid video decoder 100 shown in FIG. 1 in the fact that the extractor 110 is configured to extract filter information 310 for the block of the current picture from the data stream 112. Furthermore, the predictor 120 is configured to adapt the IIR filter 122 and/or the FIR filter 124 using the filter information 310. The IIR filter 122 and/or the FIR filter 124 may be adaptively estimated in a hybrid video encoder (for example in a hybrid video encoder according to the FIGS. 5 and 6) and may be transmitted to the hybrid video decoder 300 within the data stream 112 as the filter information 310. The data stream 112 may also be called a bit stream. This can lead to four different possibilities: fixed IIR coefficients and fixed FIR coefficients (in the case, where the filters are not adaptive), fixed IIR coefficients and adaptive FIR coefficients, adaptive IIR coefficients and fixed FIR coefficients, adaptive IIR coefficients and adaptive FIR coefficients. Therefore, the filter information 310 may be dependent on which one of the mentioned four possibilities is chosen for the IIR filter 122 and the FIR filter 124.

According to some embodiments the predictor 120 may comprise a memory with at least two different filter parameters for the IIR filter 122 and/or the FIR filter 124 stored in this memory. The predictor 120 may be configured to select one out of the at least two filter parameters, depending on the filter information 310, to adapt the IIR filter 122 and/or the FIR filter 124 based on the selected filter parameter. In other words, a set of possible filters can be stored in the encoder and the hybrid video decoder 300. The filter information 310 may determine which one of the possible filters is used for upsampling or filtering the block of the current picture. For example, the filter information 310 could determine indices of the used filters from the set. These indices could be predicted or signaled as the filter information 310 in the data stream 112. The memory may, for example, be a lookup table. The filter parameters may, for example, be transfer functions or pole zero values or gain values of the IIR filter 122 and/or FIR filter 124.

According to some further embodiments, the filter information 310 indicates a pole zero value of a transfer function of the IIR filter 122 and/or filter tap coefficients of the FIR filter 124 and the predictor 120 is configured to adapt the IIR filter 122 and/or the FIR filter 124 by inserting the pole zero value into a parameterization of the IIR filter 122 and/or the filter tap coefficients into a parameterization of the FIR filter 124. In other words, the pole zero values and eventually gain values of the IIR filter 122 and/or of the FIR filter 124 can be transmitted as filter information 310 in the data stream 112, and the predictor 120 is configured to adapt the IIR filter 122 and/or the FIR filter 124 based on this pole zero and eventually gain values.

The transmission of this filter information 310 regarding the employed filters (IIR filter 122 and/or the FIR filter 124) can be done in multiple ways. A few of the possibilities are mentioned below. For example, the employed filter coefficients can be directly transmitted or the filter coefficients can be predicted and the prediction residual can be transmitted in the bit stream or data stream 112. Alternatively, as mentioned before, the pole zero values and/or gain values can be transmitted. Furthermore, as described before, a set of possible filters can be stored in encoder and decoder and the indices of the used filters from the set can be predicted or signaled in the bit stream or data stream 112. The filter information 310 may correspond to a block of a current picture or to the complete current picture or to any subset, such as a slice of the current picture.

In case of the reconstructed pictures being composed of multiple color planes, the determination (the determination of the filter coefficients) of filters can be done considering either the primary plane of the group or a subset of planes or all planes of the groups. For example, adaptive filters can be estimated using luminance plane samples and applied for all of the planes (luminance planes and chrominance planes). Furthermore, the adaptive filters can be applied selectively to some planes only, while keeping the upsampling filters (IIR filter 122 and/or the FIR filter 124) of other planes fixed. For example, luminance upsampling filters may be adapted and chrominance upsampling filters fixed or other possible combinations.

According to some embodiments an IIR pre-filer 124 may only be employed for a luminance plane and no IIR pre-filter may be employed for chrominance planes, or other possible combinations.

According to some embodiments, the IIR filter 122 and/or the FIR filter 124 may be two-dimensional filters. The two-dimensional IIR filters and/or FIR filters may be designed to be separable in this case, a significant reduction in computational complexity can be obtained by convolving one one-dimensional filter in a first direction (e.g. a horizontal direction) and one one-dimensional filter in a second direction (e.g. a vertical direction). A result of the filter design process may, for example, be to approximate some desired filter as a separable filter or as a sum of separable filters. A separable structure of the IIR filter 122 and/or the FIR filter 124 leads to a less complex implementation of the filters, for example in a hybrid video encoder or hybrid video decoder.

In other words, according to some embodiments, the predictor 120 may be configured, such that the IIR filter 122 comprises a concatenation of a first one-dimensional IIR filter along a first direction (for example, along the horizontal direction) and of a second one-dimensional IIR filter along a second direction (for example, along the vertical direction).

According to some embodiments, the first one-dimensional IIR filter along the first direction may be equal to the second one-dimensional IIR filter along the second direction.

According to further embodiments, a one-dimensional transfer function of the first one-dimensional IIR filter and/or of the second one-dimensional IIR filter may be based on a first order causal IIR filter and on a first order anti-causal IIR filter.

The above described separability of the filters may be used in embodiments of the present invention for massively parallel processing in each direction. A one dimensional filter may therefore be applied on multiple samples simultaneously in each direction for achieving a high amount of parallelism, and therefore achieving a significant reduction in computation time.

Figure 4:
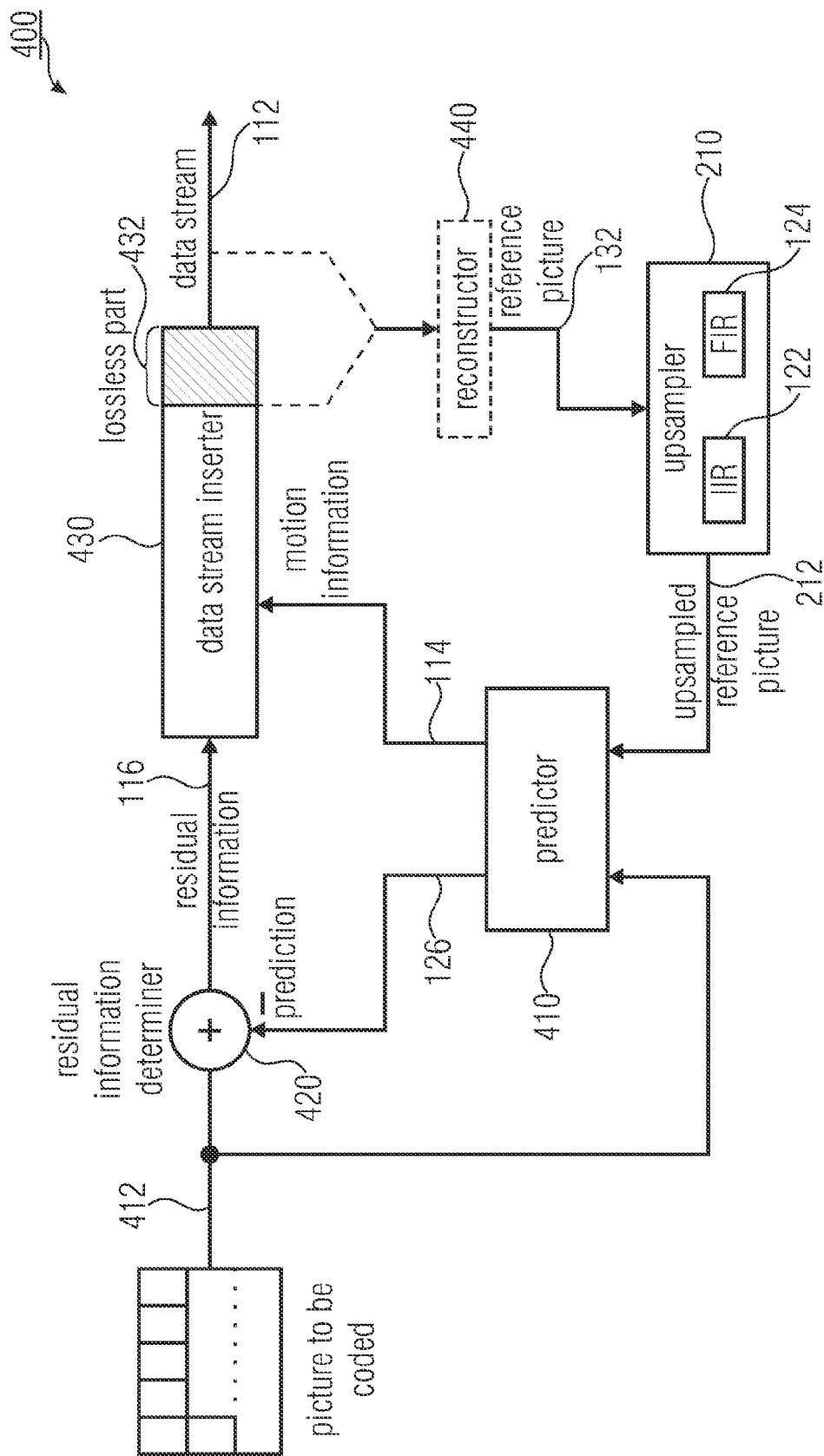
FIG. 4 shows a block diagram of a hybrid video encoder according to a further embodiment of the present invention.

FIG. 4 shows a block diagram of a hybrid video encoder 400 according to an embodiment of the present invention. The hybrid video encoder 400 comprises an upsampler 210 configured to upsample a reference picture 132 at sub sample resolution using a combination of an IIR filter 122 and an FIR filter 124 to obtain an upsampled version 212 of the reference picture 132. The upsampler 210 may be similar to the upsampler 210 according to the FIGS. 2a and 2b. The hybrid video encoder 400 further comprises a predictor 410 to determine a motion compensated prediction 126 for a block of a current picture 412, corresponding to a motion information 114 for the block of the current picture, using the upsampled version 212 of the reference picture 132. The hybrid video encoder 400 further comprises a residual information determiner 420, which is configured to determine a residual information 116 for the block of the current picture 412 by using the motion compensated prediction 126 (determined from the predictor 410) for the block of the current picture 412 and the block of the current picture 412. The hybrid video encoder 400 further comprises a data stream inserter 430, which is configured to insert the motion information 114 for the block of the current picture 412 and the residual information 116 for the block of the current picture 412 into a data stream 112.

The hybrid video encoder 400 may work as described in the following. The current picture 412 which has to be coded is fed to the predictor 410. The predictor 410 compares a block of the current picture 412 with the upsampled version 212 of the reference picture 132. The reference picture 132 may be a reconstructed version of a previously encoded picture (a picture preceding the current picture 412). The reference picture 132 has been upsampled to obtain the upsampled version 212 of the reference picture 132 by applying a combination of the IIR filter 122 and the FIR filter 124 to the reference picture 132 by the upsampler 210. Compared to the described conventional technology, the combination of the IIR filter 122 and the FIR filter 124 provides an improved version of the upsampled version 212 of the reference picture 132, as this is known in the conventional technology. The predictor 410 which compares the current picture 412 with the upsampled version 212 of the reference picture 132 may be able to determine a better motion information, than in case of a worse resolution and therefore a better prediction 126 for the block of the current picture 412. The predictor 410 compares the block of the current picture 412 with the upsampled version 212 of the reference picture 132, and determines motion information 114, dependent on where the block of the current picture 412 optimally fits into the upsampled version 212 of the reference picture 132. The predictor 410 may restrict its search space for possible motion information and in searching for the optimal motion information, the predictor 410 may apply, as supporting points, a subset of the possible motion information to determine a resulting residual information. Finally, the predictor 410 combines the motion information 114 determined with the upsampled version 212 of the reference picture 132 to determine the motion compensated prediction 126 for the block of the current picture 412. The residual information determiner 420 subtracts the motion compensated prediction 126 for the block of the current picture 412 from the block of the current picture 412 to determine a residual information 116 for the block of the current picture. As mentioned before, by employing an IIR filter 122 in combination with an FIR filter 124 in the upsampling process of the reference picture 132, a better prediction 126 for the block of the current picture 412 may be obtained, than in an FIR only system. Hence, the residual information 116 for the block of the current picture 412 may be smaller and may, therefore, be represented by fewer bits in the data stream 112. The residual information 116 for the block of the current picture 412 and the motion information 114 for the block of the current picture 412 are then inserted into the data stream 112 by the data stream inserter 430. Inside the data stream inserter 430 the residual information 116 and the motion information 114 and some optional additional side information for the block of the current picture 412 may be entropy coded. The residual information 116 may be transformed and the resulting transformation coefficients may be quantized before losslessly coded. A quality loss of the shown hybrid video encoder 400 may only occur in the quantization process of the transformation coefficients, if any. As it can be seen from the reference numbers, some parts of the hybrid video encoder 400 are the same as in the hybrid video decoder 100 according to FIG. 1. This is the case because the motion information 114 and the residual information 116 for the block of the current picture 412 are used in the hybrid video decoder 100 to reconstruct the current picture, which then may be used as a reference picture 132 for a subsequent following picture. The upsampler 210, which performs the upsampling of the reference picture 132 by using the combination of the IIR filter 122 and the FIR filter 124 may also be equal in the hybrid video encoder and the corresponding hybrid video decoder, such that the upsampled version 212 of the reference picture 132 determined at the hybrid video encoder 400 is the same as the upsampled version 212 of the reference picture 132 determined at the hybrid video decoder 100.

According to some embodiments, as it is shown in FIG. 4, the hybrid video encoder 400 may comprise a reconstructor 440, which is configured to obtain the reference picture 132 as a reconstructed version of a previously encoded picture. The reconstructor 440 may therefore extract the motion information 114 and the residual information 116 out of the data stream 112. Alternatively, however, same may be configured to obtain the residual information 116 and the motion information 114 from an interface 432 within the data stream inserter 430 separating a lossy part and lossless part of the data stream inserter 430 at in which interface 432, for example, the motion information 114 and the residual information 116 are not yet coded such as, for example, entropy encoded.

As mentioned before, the IIR filter 122 and/or the FIR filter 124 may be adaptive. Parameters of the IIR filter 122 and/or the FIR filter 124 may, for example, be different for different pictures, which have to be coded, or blocks or slices of pictures, which have to be coded.

Applying an FIR filter kernel (of the FIR filter 124) on samples lying on/and or close to a picture boundary can necessitate an extension of the picture. This extension is also called padding. The number of additional samples to be padded (added at the picture boundary) depends on the filter support (e.g. on the number of taps the FIR filter comprises).

According to some embodiments of the present invention the picture to be FIR filtered may be extended using mirror symmetric boundary conditions. Further embodiments may assume that all samples outside the boundaries are zero or equal to the closest sample on the boundary, that the picture is repeated periodically or other possible extensions.

This padding at picture boundaries may also apply for the IIR filter 122. Therefore the reference picture 132 may be padded at its boundaries before applying the IIR filter 122.

According to further embodiments of the present invention the reconstructed picture (the reference picture 132) may be split into smaller regions and each region may be upsampled separately (in the upsampler 210 using the combination of the IIR filter 122 and FIR filter 124). A region may for example be a block of the picture or a slice of the picture. A size or a shape of a region may be arbitrary, different regions of a picture may have different sizes or shapes. Each region may have overlap with neighboring regions for handling of boundary samples (samples lying on or at a region boundary). Regions containing picture boundaries may be extended beyond the boundaries using padding, as described before. Furthermore the upsampling of the regions may be performed during motion compensated prediction on the fly i.e. regions of the reference picture 132 may be upsampled on demand when motion compensated prediction (e.g. the motion compensation block 214 of the predictor 120 or the predictor 410 of the encoder 400) tries to access a region of the reference picture 132. Hence, the IIR filtering using the IIR filter 122 and the FIR filtering using the FIR 124 may both be performed on the fly (on demand).

In this way, a region wise parallel processing for IIR and/or FIR stages (filters) can be achieved i.e. different regions of the reference picture may be upsampled in parallel and therefore predictions for different block of the current picture may be determined in parallel.

Furthermore, in this way, a region-wise adaptivity of the IIR filter 122 and/or the FIR filter 124 may be employed too.

Figure 5:
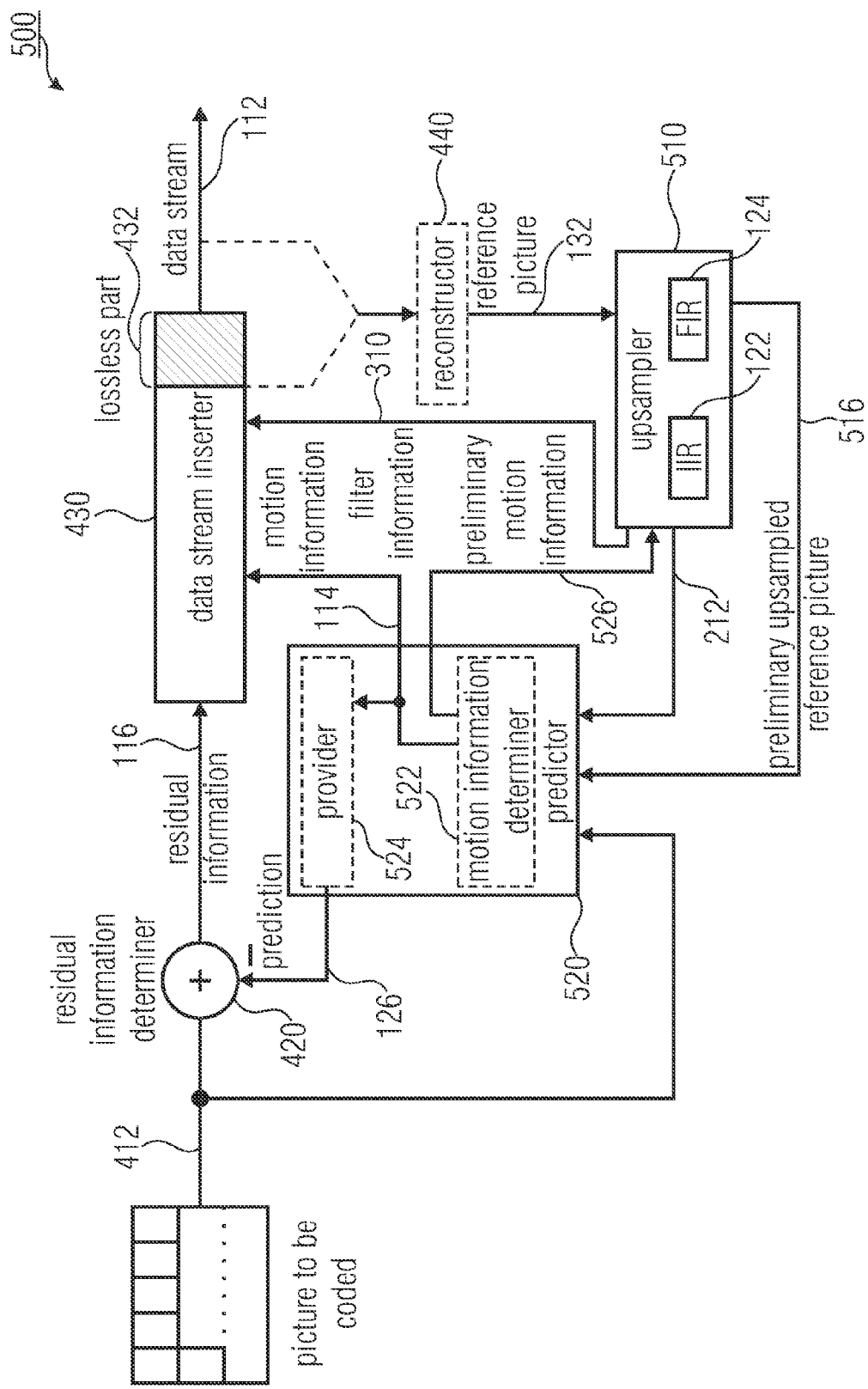
FIG. 5 shows a block diagram of a hybrid video encoder according to a further embodiment of the present invention.

FIG. 5 shows a hybrid video encoder 500 according to a further embodiment of the present invention. The hybrid video encoder 500 employs an adaptive filtering, wherein parameters for the filter are generated based on the motion information for the block of the current picture. The hybrid video encoder 500 differs from the hybrid video encoder 400 according to FIG. 4 in the fact that a predictor 520 of the hybrid video encoder 500 is further configured to determine a preliminary motion information 526 for the block of the current picture 412 based on a preliminary upsampled version 516 of the reference picture 132. The preliminary upsampled version 516 of the reference picture 132 may in the following also be called preliminary upsampled reference picture 516. Furthermore, the upsampler 510 is configured to determine a filter information 310 for the block of the current picture 412 based on the preliminary motion information 526 for the block of the current picture 412. The upsampler 510 is further configured to adapt the IIR filter 122 and/or the FIR filter 124 based on the filter information 310. Furthermore, the data stream inserter 430 is configured to insert the filter information 310 into the data stream 112. In other words, the preliminary motion information 526 for the block of the current picture 412 or the current picture 412 is initially estimated in a motion information determiner 522 of the predictor 520 using the preliminary upsampled version 516 of the reference picture 132. The preliminary upsampled version 516 of the reference picture 132 is generated by the upsampler 510 by using the combination of the IIR filter 122 and the FIR filter 124. Parameters of the IIR filter 122 and the FIR filter 124 may be fixed. The preliminary motion information 526 for the block of the current picture 412 determined by the motion information determiner 522 of the predictor 520 may then be used to tune (adapt) the upsampling filters (IIR filter 122 and/or the FIR filter 124).

Afterwards the reference picture 132 is upsampled in the upsampler 510 again using the new (adapted) filters. As mentioned before for the hybrid video decoder 300 according to FIG. 3, any possibilities of adaptivity of the filter is possible. This means the IIR filter 122 may be adaptive or not and the FIR filter 124 may be adaptive or not, too. The filter information 310, therefore, may comprise IIR filter information and/or FIR filter information.

The (improved) upsampled version 212 of the reference picture 132 is then used to determine (improved) motion information 114 for the block of the current picture 412 in the motion information determiner 522. The motion information 114 for the block of the current picture 412 is then used by a provider 524 of the predictor 520 in combination with the upsampled version 212 of the reference picture 132 to obtain the prediction 126 for the block of the current picture 412.

In other words, the current picture is re-encoded to take advantage of the improved upsampled reference pictures (being determined by the upsampler 510 with the adaptive IIR filter 122 and/or the adaptive FIR filter 124).

The filter information 310 determined by the upsampler 510 is together with the residual information 116 and the motion information 114 inserted into the data stream 112 by the data stream inserter 430. As mentioned before, a decoder (for example the hybrid video decoder 300 according to FIG. 3) may extract the filter information 310 out of the data stream 112 to adapts its IIR filter 122 and/or its FIR filter 124.

By adapting the filters of the upsampler 510 based on the motion information 114, the residual information 116 can be chosen to be minimal and would therefore need fewer bits in the data stream 112. The filter information 310, which are inserted as side information into the data stream 112 may especially comprise less bits than the bits saved in the residual information 116 by applying the adaptive filters.

Although in the above mentioned embodiment the motion information 114, which is inserted into the data stream 112, is obtained, using the (improved) upsampled version 212 of the reference picture 132, which means the motion information is recalculated (since it has been calculated before using the preliminary upsampled picture 516), according to further embodiments, the motion information may not be recalculated. In this case, the motion information 114 may be replaced by the preliminary motion information 526 and inserted in the data stream 112. Therefore the determination of the motion information is not performed again, and a computational overhead is reduced. The prediction 126 for the block of the current picture 412, may then be determined by the provider 524 by using the preliminary motion information 526 and the (improved) upsampled version 212 of the reference picture 132.

According to further embodiments of the present invention the generated filter parameters (the filter information 310) may not be used to improve the prediction 126 of the block of the current picture 412. But the determined filter information 310 for the block of the current picture 412 may then be used to improve the upsampled reference picture generation for subsequent following pictures of the current picture 412 in the upsampler 510. In this case, the current picture would not have to be reencoded, and therefore no preliminary upsampled reference picture and no preliminary motion information for the block of the current picture 412 would be determined. The upsampled version 212 of the reference picture 132, may then be determined in the upsampler 510 from the reference picture 132 using filter information for adapting the IIR filter 122 and/or the FIR filter 124 which have been determined based on motion information of blocks of previously encoded pictures.

Figure 6:
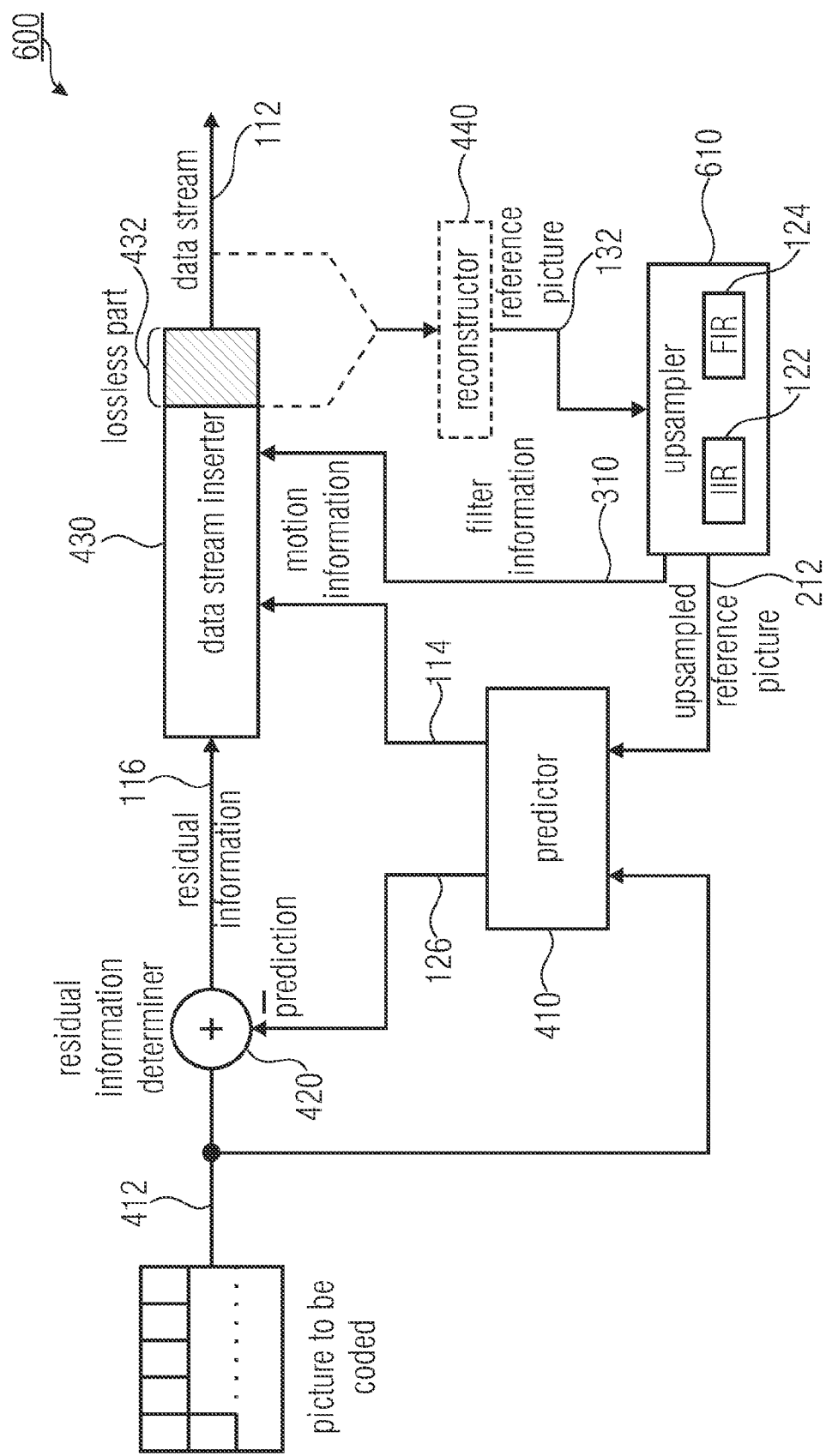
FIG. 6 shows a block diagram of a hybrid video encoder according to a further embodiment of the present invention.

FIG. 6 shows a block diagram of a hybrid video encoder 600 according to a further embodiment of the present invention. The hybrid video encoder 600 implements another possibility of adaptive filtering in an upsampler 610 of the hybrid video encoder 600. The upsampler 610 is configured to determine a filter information 310 for the block of the current picture 412 independent from motion information 114 for the block of the current picture 412. The upsampler 610 may, for example, determine the filter information 310 dependent on the reference picture 132 and/or the original picture. The upsampler 610 is further configured to adapt the IIR filter 122 and/or the FIR filter 124 based filter information 310. The upsampler 610 is further configured to determine the upsampled version 212 of the reference picture 132 by using the combination of the IIR filter 122 and the FIR filter 124, wherein at least one of the two filters is adaptive. Because of the adaptation of at least one of the filters of the upsampler 610, the upsampled version 212 of the reference picture 132 is improved compared to the hybrid video encoder 400 according to FIG. 4, wherein coefficients of the IIR filter 122 and of the FIR filter 124 may be fixed for every reference picture 132. The predictor 410 then determines the prediction 126 for the block of the current picture 412 and the motion information 114 for the block of the current picture 412 by using the block of the current picture 412 and the upsampled version 212 of the reference picture 132. As in the previous embodiment, the data stream inserter 430 is configured to insert the filter information 310 for the block of the current picture 412 into the data stream 112.

In other words, in the embodiment shown in FIG. 6 the filters (the IIR filter 122 and/or the FIR filter 124) of the upsampler 610 (or at least one of the filters of the upsampler 610) are adapted such that the upsampling of the current reconstructed picture (the reference picture 132 being reconstructed by the reconstructor 440) is improved. This leads to improved motion compensated prediction for subsequent pictures using the currently upsampled picture as a reference.

According to some embodiments, the filters may be adapted dependent on the reference picture 132. This means if a reconstructed picture is used as a reference picture 132 for a plurality of subsequent following pictures (which means that the motion information 114 of the subsequent following pictures all refer to the reference picture 132) the filter information 310 for the filters may remain the same for all the subsequent following pictures. The IIR filtering and eventually the FIR filtering (if no selective FIR filtering is performed) has therefore been performed only once on the reference picture 132 for all the subsequent following pictures referring to the reference picture 132.

Besides the above described picture adaptive structure, the adaptivity of the filters can be employed for a set of samples that represent blocks, slices or groups of pictures, etc.

As mentioned before, for the decoder, the filter information 310 may be directly transmitted or the filter coefficients can be predicted and the prediction residual can be transmitted in the data stream 112. Alternatively, pole zero and gain values can be transmitted within the filter information 310, and furthermore a set of possible filters can be stored in a hybrid video encoder (for example the hybrid video encoder 500 or 600) and decoder (for example in the hybrid video decoder 300) and the indices of the used filters (of the used IIR filter 122 and/or FIR filter 124) from the set can be predicted or signaled in the data stream 112 as the filter information 310.

According to some embodiments, as described before, adaptivtiy of the filters may be different for different color planes of pictures.

According to some embodiments the IIR filter 122 may be a pre-filter and the FIR filter 124 may be a post filter, like it has been described with the upsampler 210 according to FIG. 2b. The reference picture 132 may therefore be IIR filtered with the IIR filter 122 to determine an IIR filtered version 220 of the reference picture 132. The FIR filter 124 may then be applied to the IIR filtered version 220 of the reference picture 132 to determine the upsampled reference picture 212.

According to some embodiments a hybrid video encoder may also be configured to perform on-the-fly FIR filtering to save memory, like it has been described before for a hybrid video decoder. The FIR filter 124 may therefore be applied block-wise on the reference picture 132 or on the IIR filtered version 220 of the reference picture 132 (if the IIR filter 122 is applied as pre filter). In the following it is assumed that the FIR filter 124 is applied block wise on the IIR filtered version 220 of the reference picture 132.

A block size of a block (on which the FIR 124 filter is applied) of the IIR filtered version 220 of the reference picture 132 may be determined by a search area of the motion information 114 for the block of the current picture 412. The FIR filtering with the FIR filter 124 would then result in an upsampled version of the block of the IIR filtered version 220 of the reference picture 132. By using on-the-fly FIR filtering only a subset of upsampled sample positions of the upsampled reference picture 212 may be generated and stored, which reduces the requirements for memory in an upsampler of a hybrid video encoder according to an embodiment of the present invention. The search area for a motion information 114 of a block of a current picture may for example be determined by a maximum range of the motion information 114. For example, assuming a block of a current picture is 2×2 samples with the coordinates A(0; 0), B(1; 0), C(0; 1) and D(1; 1) and a motion information 114 or a motion vector 114 with a search area of maximum +/−10 in a first direction and +/−10 in a second direction. This means the sample A can be moved maximum by +/−10 sample positions in the first direction and maximum by +/−10 sample positions in the second direction. The same corresponds to the other samples of the current picture, for example the sample D would be shifted maximum by +/−10 sample positions in the first direction and by +/−10 sample positions in the second direction. Therefore the block of the current picture 412 determines together with a search area of the motion information 114 for the block of the current picture 412 the size of the block of the IIR filtered version 220 of the reference picture 132 for which the FIR filter 124 is applied block-wise. The block of the IIR filtered version 220 of the reference picture 132 for the above mentioned example may for example have the corner coordinates F(−10; −10), G(11; −10), H(−10; 11) and I(11; 11). The block of the IIR filtered version 220 of the reference picture 132 may therefore be bigger than the block of the current picture 412 but smaller than a complete upsampled reference picture 212. The block of the IIR filtered version 220 of the reference picture 132 corresponding to the block of the current picture may, at least partially, overlap with a further block of the IIR filtered version 220 of the reference picture 132 corresponding to a further block of the current picture.

In other words, an upsampler may be configured to, in providing a further block of the upsampled reference picture 212 for a further block of the current picture 412, depending on a further motion information for the further block of the current picture, block-wise apply the FIR filter 124 at a further block of the IIR filtered version 220 of the reference picture 132 anew. A block size of the further block of the IIR filtered version 220 of the reference picture 132 is determined by a search area of the further motion information for the further block of the current picture. The upsampler 210 determines therefore an upsampled version of the further block of the IIR filtered version 220 of the reference picture 132. As mentioned before the further block of the IIR filtered version 220 of the reference picture 132 may, at least partially, overlap with another block of the IIR filtered version 220 of the reference picture 132, determined for a previously encoded block of the current picture or a previously encoded picture.

In the following an example implementation of an upsampler used in a hybrid video encoder or a hybrid video decoder according to an embodiment of the present invention shall be explained in more detail. An integer precision representation of real world data with a fixed number of digits after the decimal point, referred to as fixed point representation in this section, can be used in the encoder and decoder for fast hardware and/or fast software implementation. Fixed point numbers are used for representing fractional values, usually in base 2 or base 10, when the executing processor/hardware has no floating point unit. Most low cost embedded microprocessors and microcontrollers do not have a floating point unit. A fixed point implementation also makes it easier to guarantee matching values in encoder and decoder, for example in case of architectural differences in encoder and decoder platforms. Hence, the implementation of IIR and FIR filters in fixed representation is of advantage especially for standardization purposes.

A reconstructed picture 132 (or a reference picture 132) may be represented using $M_1$ bits, generally denoting unsigned sample values ranging from 0 to $2^{M_1}-1$. The output of the upsampling process s, that means the upsampled reference picture 212, is represented using $M_2$ bits. During the estimation of samples between known integer grid samples (in the FIR filter 124), the output can exceed the range of the input. Hence, a sign bit and an overflow bit is needed to include these cases in the output signal (in the upsampled reference picture 212). Therefore, the number of remaining bits in the upsampled reference picture 212 is, $$Q=M_2-M_1-2. \qquad (2)$$

These extra Q bits can be used for increasing the precision of the output signal (of the upsampled reference picture 212). This helps to improve the motion compensation.

According to some embodiments, the samples of the reconstructed picture r (of the reference picture 132) are shifted left by Q bits before IIR filtering (with the IIR filter 122). This is shown in the following equation:

$$r'[x,y]=r[x,y]<<Q. \qquad (3)$$

Wherein [x, y] designates picture coordinates, r the reconstructed picture or reference picture 132 and r' the reconstructed picture or the reference picture 132 shifted by Q. Considering a 2D separable IIR filter (the IIR filter 122) with a pair of conjugate symmetric poles, the one dimensional transfer function may be defined as:

$$H(z) = g \cdot \left(\frac{1}{1-z_1z^{-1}}\right)\left(\frac{-z_1}{1-z_1z}\right), \qquad (4)$$

wherein $z_1$ is a pole that is within the unit circle in z-transform domain, and g is a normalization factor. The factorization of H(z) shown above can be implemented as a first order causal filter and a first order anti-causal filter and the normalization g can be performed after the filtering. These filters can be applied row-wise on the shifted samples of the reference picture 132 r' [x,y] for obtaining row-wise samples of the IIR filtered version 220 of the reference picture 132 c'[x,y] and later column-wise on c'[x,y] to get the IIR filtered version 220 of the reference 132 c. The position of the pole $z_1$ in the unit circle ($|z_1|<1$) allows a representation as a $T_1$ bit fix point number with $T_1-1$ precision bits and 1 sign bit. The row-wise causal filtering and the anti-causal filtering can be performed as:

$$c^+[x,y]=r'[x,y]+rnd(z_1c^+[x-1,y]),(x=1,\ldots,W-1), \qquad (5)$$

$$c'[x,y]=rnd(z_1(c'[x+1,y]-c^+[x,y])),(x=W-2,\ldots 0), \qquad (6)$$

wherein $rnd(z_1 \cdot a)$ performs a shift and round operation, which can be made dependent on $T_1-1$, the number of precision bits in $z_1$. The column-wise filtering can be performed in a similar way resulting in $M_3$ bit output c (the IIR filtered version 220 of the reference picture 132) with Q precision bits after decimal point.

As mentioned before, the row wise filtering (in the first direction) may be performed for each row in parallel, and afterwards, the column wise filtering (in the second direction) may be performed for each column in parallel.

According to some embodiments the FIR filtering process in the FIR filter 124 may also be performed fixed point. The $M_3$ bit input c (the IIR filtered version 220 of the reference picture 132) to the FIR filter 124 is filtered to obtain the $M_2$ bit upsampled reference picture 212 (s). An FIR kernel $\underline{K}$ can be chosen such that the magnitude of filter coefficients is less than unity and hence can be represented as $T_2$ bit fixed point numbers with $T_2-1$ precision bits and 1 sign bit. The FIR filtering stage (the FIR filter 124) performs convolution with the IIR filtered version 220 of the reference picture 132 (c) to yield the upsampled reference picture 212 (s). In the convolution shift and round operation can be made dependent on the bit size $T_2-1$, the number of precision bits in the FIR filter coefficients (in the FIR filter kernel $\underline{K}$). The potential overflow/underflow in the summation process of the FIR stage (of the FIR filter 124) is already taken care of, by allocating 1 bit for overflow and one bit for sign of the interpolated sample (of a sample of the upsampled reference picture 212 (s)).

In the following a specific example of a fixed point implementation of IIR filtering and FIR filtering tuned for low complexity 16 bit operation should be shown. In the following $M_1=8$, $M_2=M_3=16$, $T_1=T_2=16$, Q=6. The pole $z_1$ is chosen to be a 16 bit fixed point number with 15 precision bits, $z_1=-11726$. A fixed point normalization factor of g=21 with 2 precision bits is applied after FIR filtering in the FIR filter 124.

The FIR kernel $\underline{K}$ used for quarter sample interpolation is described in a 4×4 matrix as following:

$$\underline{K} = \begin{pmatrix} 6242 & 20284 & 6242 & 0 \\ 2889 & 19079 & 10520 & 280 \\ 1073 & 15311 & 15311 & 1073 \\ 280 & 10520 & 19079 & 2889 \end{pmatrix}. \quad (7)$$

In the FIR filter 124 the filter kernel $\underline{K}$ is applied to a one dimensional vector according to:

$$\begin{pmatrix} G' \\ a \\ b \\ c \end{pmatrix} = \underline{K} \cdot \begin{pmatrix} F \\ G \\ H \\ I \end{pmatrix}, \quad (8)$$

Wherein F, G, H, I are sample positions of the IIR filtered version 220 of the reference picture 132, a, b, c are sub-sample positions lying between G and H and G' is an FIR filtered sample at G.

The result of the FIR filtering (the values G', a, b, c) is shifted and rounded down by two places, in accordance with a number of precision bits of the normalization factor g.

As it can be seen from the filter kernel $\underline{K}$, the FIR filter 124 is a 4-tap FIR filter, which is compared to a typically used 6-tap FIR filter for interpolation in media codec less complex. The use of the IIR filter 122 in combination with the FIR filter 124 enables this easier implementation of the FIR filter 124 for interpolation, and still provides a sharper cutoff in frequency response of the overall upsampling system, since this is known in the conventional technology.

Figure 7:
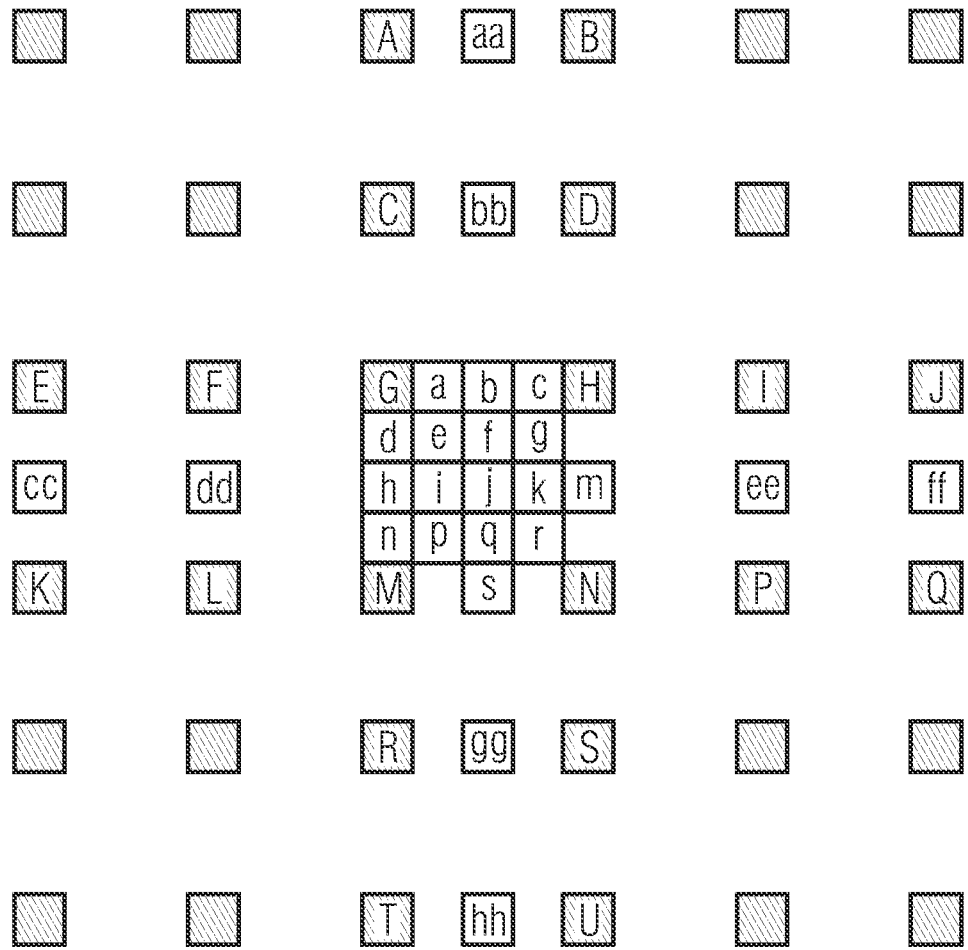
FIG. 7 shows an example for a block of a reference picture with sample positions indicated by upper case letters and sub-sample positions indicated by lower case letters.

FIG. 7 shows a drawing of samples of an IIR filtered version 220 of a reference picture 132 with sample positions in upper case letters and sub-sample positions in lower case letters. Using the filter kernel $\underline{K}$ the sub-sample position a would be calculated as:

$$a=2889 \cdot F + 19079 \cdot G + 10520 \cdot H + 280 \cdot I. \quad (9)$$

The presentation of the FIR kernel $\underline{K}$ is also a fixed point representation, which means that the filter coefficients shown in the example are bit shifted, to use fixed point arithmetic for calculation of the FIR filtering process. If the FIR kernel $\underline{K}$ is for example shifted by 15 bits the value 6242 would correspond to 0.19049072. Therefore other FIR kernels may be applied, which are proportional to the shown filter kernel $\underline{K}$ to receive the same upsampled version 220 of the reference picture 132.

According to further embodiments an upsampler in a hybrid video decoder or a hybrid video encoder according to an embodiment of the present invention may be suitable for upsampled reference picture generation for translation as well as parametric motion models. The motion field in case of parametric motion models can refer to arbitrary position in the upsampled reference pictures. Therefore, the referenced positions need not necessarily lie on a uniform grid. For such a requirement, the IIR filtering (with the IIR filter 122) can still be applied as a pre-filter independent of the necessitated positions. The FIR filter (the FIR filter 124), which performs convolution with integer grid samples, now has to account for the varying shifts with respect to the integer grid.

According to some embodiments the FIR filter 124 is generated from a continuous kernel function by sampling it at the locations of interest. Assembling and convolution can also be performed on-the-fly, as it has been described already before.

Embodiments of the present invention can be extended in a straightforward way to use more than one reference picture 132 for a motion compensated prediction. In case of multiple reference picture prediction, the predictor can stem from any of the previously reconstructed pictures. In this case, the upsampling of reconstructed pictures (of the reference pictures 132) to generate the upsampled versions 220 of the reference pictures can be done using fixed filters (a fixed IIR filter 122 and an fixed FIR filter 124) or can be done using adaptive filters (adaptive IIR filter 122 and/or adaptive FIR filter 124) depending on current or previous pictures.

Furthermore, in multi-hypothesis prediction, the predictor can be obtained by weighted summation of many predictors (for example by weighted summation of motion information 114), which are also called hypothesis, from same or different upsampled reference pictures 220. The estimation of IIR filters 122 and/or FIR filters 124 (the estimation of the parameters) can either be adaptive to the number of hypothesis or can be independent of them. According to some embodiments, the FIR kernel for P-blocks (single hypothesis, referring to only one reference picture 132) is generated in a different way compared to B-blocks (two hypothesis, referring to same or different reference picture(s) 132), in order to account for the implicit lowpass filtering in the weighted summation of the hypothesis.

According to further embodiments of the present invention an adaptivity of the filters (the IIR filter 122 and/or the FIR filter 124) used in embodiments of the present invention may be based on reference picture indices. A motion information for a block of a current picture is typically referring to a reference picture which has been encoded or decoded before the current picture. A decoder or an encoder may adapt the filters based on the reference indices corresponding to the motion information of the current block. Different reference indices may therefore correspond to different filter adaptations (for example different filter coefficients, transfer functions, pole-zero values, gain values of in general different parameters) of the filters.

Furthermore an encoder or a decoder according to an embodiment of the present invention may be configured to determine a plurality of upsampled reference pictures for one reference picture, wherein in each upsampled reference picture out of the plurality of upsampled reference pictures corresponds to a different filter information for the filters and therefore to a different adaptation of the filters. These multiple upsampled reference pictures may be generated each with fixed or adaptive filters. An encoder may signal as side information in a data stream, which one of the upsampled reference pictures was used for encoding a block of a current picture (referring to the reference picture), and therefore which one has to be used by a decoder to decode the block of the current picture. The decoder may choose the upsampled reference picture out of the plurality of upsampled reference pictures based on the side information in the data stream.

According to further embodiments, the decoder may be configured to choose the upsampled reference picture out of the plurality of upsampled reference pictures based on data derived at the decoder.

Different blocks of a current picture may refer to different reference picture indices, therefore an adaption of the filter employed for encoding or decoding the block may be performed block wise. Furthermore different blocks of a current picture may refer to the same reference picture but different upsampled reference pictures of this reference picture, as described before.

In the following a possible implementation variant of the IIR filter 122 and the FIR filter 124 (e.g. used in the predictor 120 of the hybrid video decoder 100 or in the upsampler 210 of the hybrid video encoder 400) will be described.

It has been found that the IIR filtering of the reference picture 132 introduces a deviation of IIR filtered values at full pixel positions of the reference picture 132 compared to there associated values at these full pixel positions in the reference picture 132 before interpolating. In other words, the IIR filtering does not only interpolate between the values at the full pixel positions but does also manipulate the values at the full pixel positions, which can lead to an increased residual information and therefore to a decreased compression efficiency.

This problem is solved by the predictor 120 or the upsampler 210 by choosing a pole value of the IIR filter 122 to be $-2^{-N_1}-2^{-N_2} \ldots -2^{-N_m}$ wherein $N_1 > N_2 > \ldots > N_m$ and $N_1, N_2, \ldots, N_m$ are natural numbers larger 0 and by choosing a filter parameter of the FIR filter 124 such that deviations of the IIR filtered values at the full pixel positions of the reference picture 132 compared to their associated values in the reference picture 132 before interpolating are reduced by the FIR filter 124 at least by 50%, or 70%, or 90% or 95%.

It is an idea, that a low complexity IIR and FIR filter combination can be implemented in the predictor 120 or the upsampler 210, when the pole value for the IIR filter 122 is chosen as a simple binary fraction value. By using such a simple binary fraction value for the pole of the IIR filter 122 the IIR filter 122 can be implemented multiplication free (using (only) add and shift operations).

It is another idea, that the deviations of the IIR filtered values at the full pixel positions of the reference picture 132 introduced by the IIR filter 122 can be reduced if the filter parameter of the FIR filter 124 is chosen (in dependence of the pole value of the IIR Filter 122) such that it compensates for this deviations.

In the following a method to obtain low such a low complexity IIR and FIR filter combination is described. This method can be used to obtain multiplication-free IIR and FIR filters. It can also be used to modify the number of taps of the FIR filter 124 for a given IIR filter 122 to optimize the interpolation quality.

At first it is described how the pole value for the IIR filter 122 can be determined. As an example a negative fraction with a simple binary representation is chosen, as pole value e.g. $p = -0.5$.

The value p is the causal pole of the IIR filter 122 resulting from this design procedure. The causal IIR filter 122 considered can be of the form $y[n] = x[n] + p \cdot y[n-1]$. It can be employed in conjunction with an anti-causal IIR of the form $y[n] = x[n] + p \cdot y[n-1]$.

The use of the pole value in the form of $-2^{-N_1}-2^{-N_2} \ldots -2^{-N_m}$ ($-0.5$ in the special example, which corresponds to $N_1 = 1$ and $N_2$ to $N_m$ equals 0) enables the use of a multiplication-free implementation of the causal IIR filter 122.

In the special case of $p = -2^{-N}$ the IIR filter 122 becomes $y[n] = x[n] - (y[n-1] >> N)$ The multiplication with $-2^{-N}$ can easily be implemented using low complex, easy to implement bit shifts instead of complex multiplications.

In the special case of $p = -0.5$ the IIR filter 122 becomes $y[n] = x[n] - (y[n-1] >> 1)$.

After the selection of the (single) pole value of the IIR filter 122 a filter parameter for the FIR filter 124 can be chosen, such that the deviation introduced by the IIR filter 122 to the IIR filtered values at the full pixel positions of the reference picture 132 are reduced. This filter parameter my be a basis function of the FIR filter 124.

As an example, a parametric form for a continuous basis function to be used for interpolation (using the FIR filter 124) is taken, e.g. $f(x; \alpha)$, where $\alpha$ is a set of free parameters and x denotes the x-coordinate.

According to some embodiments the basis function of the FIR filter 124 is a combination of a B-Spline function and a B-Spline function derivative.

A B-Spline function derivative may be derived by differentiating the B-Spline function. A second B-Spline function derivative may be derived by differentiating the B-Spline function twice.

In an embodiment, the basis function $f(x; \alpha)$ is a linear combination of B-Spline function and its derivatives and $\alpha$ denotes the weights of the combination.

Figure 8A:
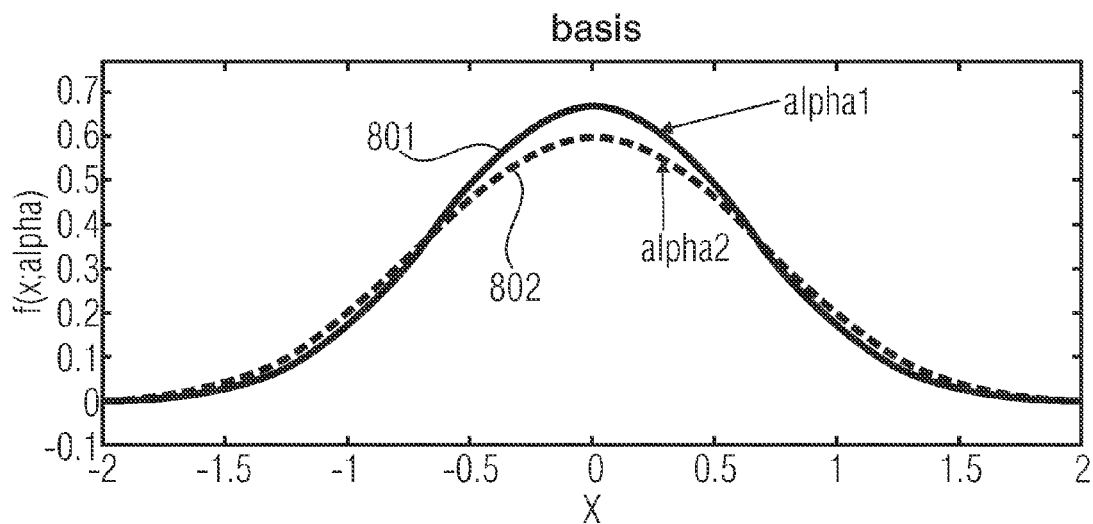
FIG. 8a-8c show diagrams for choosing a basis function for an FIR filter.

FIG. 8a shows in a diagram two different possible basis function 801, 802 for the FIR filter 124. The two different possible basis function 801, 802 differ from each other by their weighting factor $\alpha$. A first basis function 801 has the weighting factor alpha1 and a second basis function has the weighting factor alpha2.

The samples of the basis function at integer locations (full pixel positions) are expressed in terms of the free parameters, e.g.

$$F = [\ldots, f(-2,\alpha), f(-1,\alpha), f(0,\alpha), f(1,\alpha), f(2,\alpha), \ldots].$$

Figure 8B:
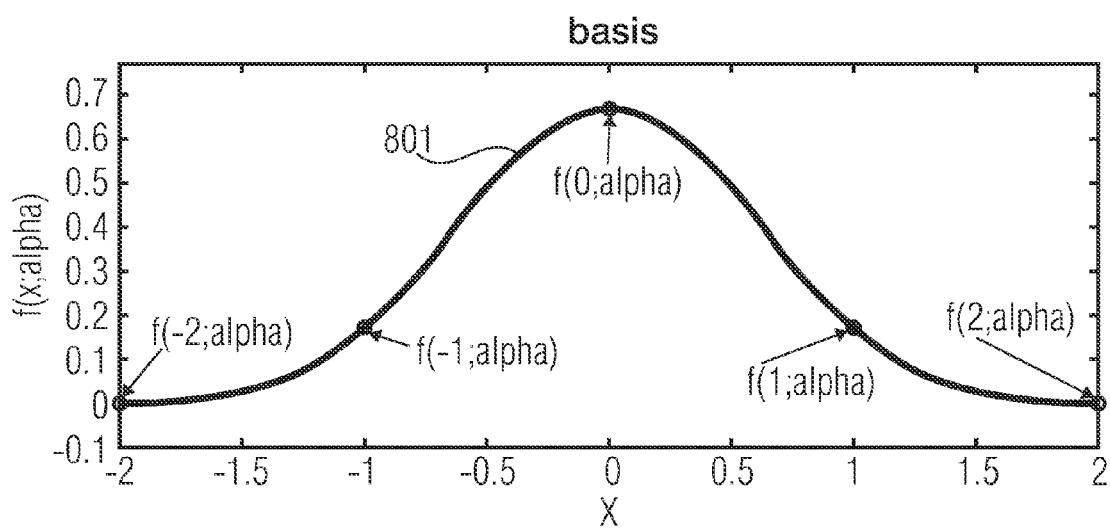
Figure 8C:
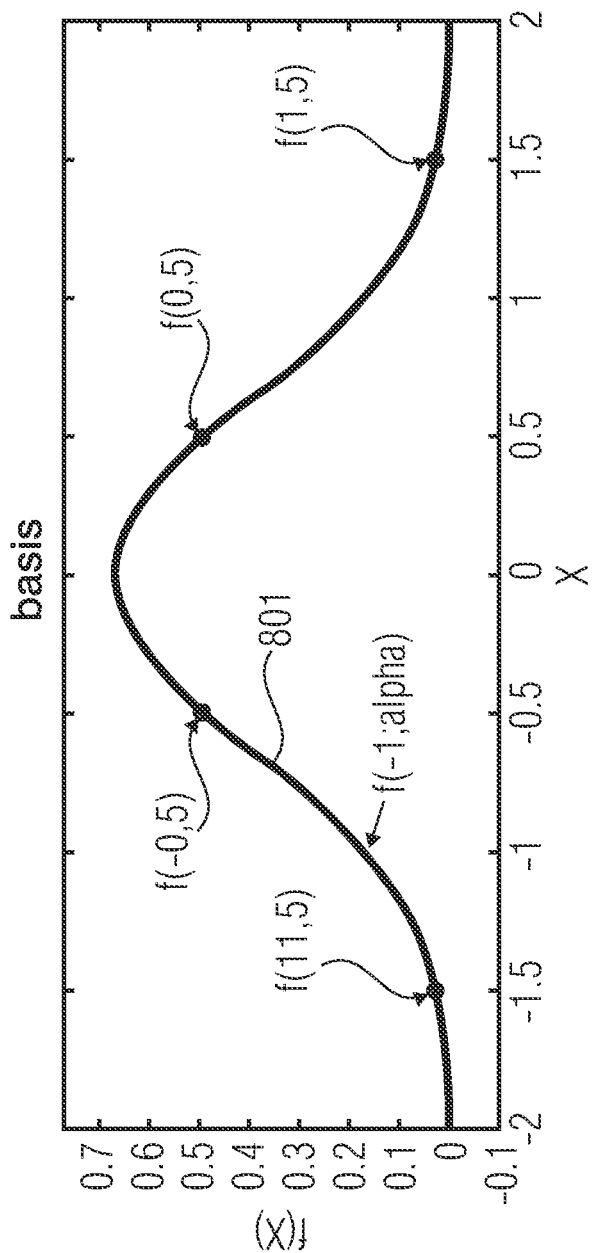

FIG. 8b shows in a diagram the first basis function 801, with the samples at the full pixel positions marked.

The free parameters of the basis function are determined (or a suitable basis function of a plurality of possible basis functions is chosen) such that the z-transform of the samples at integer locations, evaluated at the chosen pole p goes to zero, i.e. determine the parameter $\alpha$ such that $$\ldots + f(-2,\alpha) \cdot p^{-2} + f(-1,\alpha) \cdot p^{-1} + f(0,\alpha) + f(1,\alpha) \cdot p^1 + f(2,\alpha) \cdot p^2 + \ldots = 0.$$

As an additional example, the optimization for a 3-tap FIR filter for full-pixel positions is shown.

Denote the samples $[f(-1,\alpha), f(0,\alpha), f(1,\alpha)] = [b_1, b_0, b_1]$.

Let the desired FIR filter for getting full-pixel positions be of the form:

$$f[n] = [b_1, b_0, b_1]$$

Which results in a z-transform transfer function of the 3 tap FIR filter as follows:

$$F(z) = b_1 \cdot z^{-1} + b_0 + b_1 \cdot z.$$

Let the corresponding IIR filter be denoted as H(z).

In order to regenerate the full-pixel values at the output of the predictor 120 and the upsampler 210, after IIR filtering and FIR filtering the following condition is desired:

$$F(z) \times H(z) = 1.$$

Or in other words it is desired that the values of the reference picture 132 at the full pixel positions are not changed because of the IIR and FIR filtering.

That implies:

$$H(z) = \frac{1}{F(z)}$$

In order that the pole of the IIR filter be p=−0.5, F(p) should equal zero, i.e.

$$F(p)=b_1 \cdot p^{-1}+b_0+b_1 \cdot p^1=0.$$

So, α (and therefore the basis function) is determined such that $$f(-1,\alpha) \cdot p^{-1}+f(0,\alpha)+f(1,\alpha) \cdot p^1=0.$$

Therefore, the basis function can be chosen such that it reduces the deviation of the IIR filtered values at the full pixel positions of the reference picture to zero. It has been found that by a use of a linear combination of a B-Spline function and its derivatives as the basis function for the FIR filter 124 this reduction of the deviation to zero can be achieved.

The generic formulation of the optimization is as follows: Consider that the chosen poles result in an IIR filter of the form:

$$H(z) = \frac{1}{\cdots + a_2 \cdot z^{-2} + a_1 \cdot z^{-1} + a_0 + a_1 \cdot z^1 + a_2 \cdot z^2 + \cdots}$$

Then α is determined such that:

$$f(0,\alpha)=a_0, f(-1,\alpha)=a_1, f(1,\alpha)=a_1, f(-2,\alpha)=a_2, f(2,\alpha)=a_2, \ldots$$

When α is fixed, the FIR coefficients are generated by sampling $f(x)$ (the basis function found) at the desired fractional positions (in dependence on the resolution of the motion information 114 and the residual information 116).

FIG. 8d shows the sampling of $f(x)$ for half-pixel interpolation filter. The resulting FIR coefficients for half-pixel are: $[f(-1.5), f(-0.5), f(0.5), f(1.5)]$. They can be quantized and stored in finite bit width. The FIR filtering can also be implemented multiplication-free by using only shifts and adds.

Typically, the precision loss in quantization of pole values can cause artifacts in interpolation. The selection of a simple binary fraction as pole for the IIR filter 122 has an additional advantage of lossless representation in finite precision, apart from multiplication-free implementation.

In some cases it may be desired to apply an FIR filter only in a predictor of a hybrid video decoder or in an upsampler of a hybrid video encoder.

Figure 9:
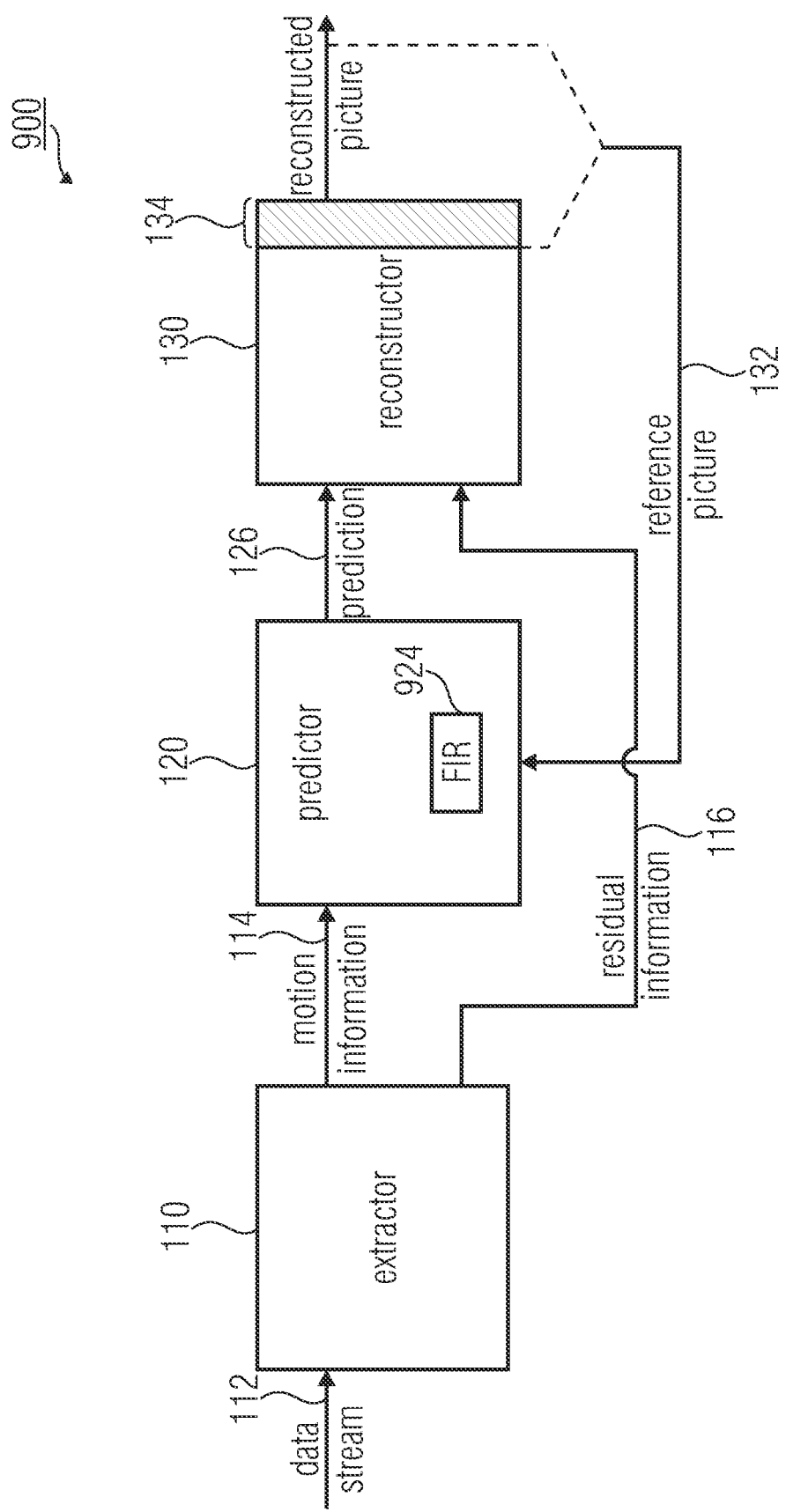
FIG. 9 shows a block diagram of a hybrid video decoder according to a further embodiment of the present invention.

FIG. 9 shows a hybrid video decoder 900 according to an embodiment of the present invention. The hybrid video decoder 900 differs from the hybrid video decoder 100 in the predictor 920 of the hybrid video decoder 900.

The predictor 920 is configured to provide, depending on the motion information 114 for the first block of the current picture, a prediction 126 for the first block of the current picture by interpolating a reference picture 132, using an FIR filter 924 only (and not using an IIR filter) formed by a combination of a B-Spline function and at least one B-Spline function derivative.

It is to be pointed out that an optimization aim in the predictor 920 is to provide the prediction 126, such that the residual information 116 is as small as possible. Therefore a quality of the prediction 126 how it would be perceived with the human eye is not relevant. This optimization goals does not coincide with the optimization for single pictures, which are optimized in regards of a good viewability for a human eye.

It has been found that with the use of a combination of a B-Spline function and at least one B-Spline function derivative forming the FIR Filter 924 a better compression efficiency can be achieved than with conventional basis function for the FIR filter 924. Or in other words, using a combination of a B-Spline function and at least one B-Spline function derivative leads to a better prediction 126 for the current picture and therefore to a smaller residual information 116 which has to be transmitted.

In the following, the design process for the FIR filter 924 will be explained in short.

A parametric form for a basis function for the FIR filter 924 to be used for interpolation is taken, e.g. $f(x; \alpha)$, where α is a set of free parameters and x denotes the x-coordinate. In an embodiment, $f(x; \alpha)$ is a linear combination of B-spline function and its derivatives and α denote the weights of the combination.

The parameter α is determined such that the basis function passes through zero at integer locations (at the full pixel positions) except origin (which corresponds to the current sample), where it takes a value of 1, i.e.:

$$f(0,\alpha)=1 \text{ and } f(N,\alpha)=0 \text{ for integer } N \neq 0.$$

Figure 10:
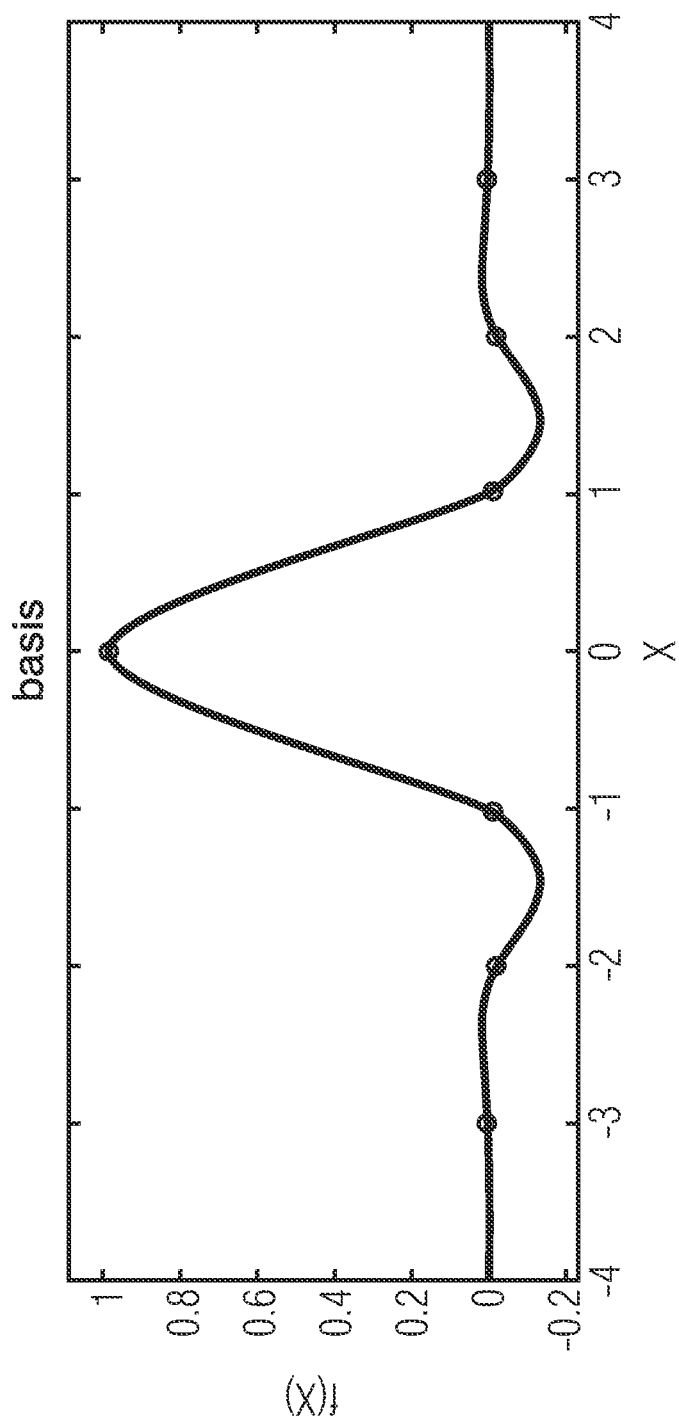
FIG. 10 shows a diagram showing a possible basis function of an FIR filter employed in the hybrid video decoder from FIG. 9.

In FIG. 10 a example for such a basis function as a linear combination of a B-spline function and its derivatives, which fulfills the above mentioned criteria is shown.

When α is fixed, the FIR coefficients are generated by sampling $f(x)$ at the desired fractional positions.

As an example, the generated FIR coefficients for a ⅛th fractional accuracy for the 4-tap case using the basis function in FIG. 10 are:

{−11, 238, 34, −5,}, //⅛
{−20, 216, 68, −8,}, //²⁄₈
{−18, 181, 107, −14,}, //³⁄₈
{−18, 146, 146, −18,}, //⁴⁄₈
{−14, 107, 181, −18,}, //⁵⁄₈
{−8, 68, 216, −20,}, //⁶⁄₈
{−5, 34, 238, −11,} //⁷⁄₈

As another example, the generated FIR coefficients for ⅛th fractional accuracy for the 6-tap case using the basis function in FIG. 10 are:

{3, −16, 243, 35, −11, 2,}, //⅛
{5, −26, 220, 73, −19, 3,}, //²⁄₈
{6, −31, 189, 114, −26, 4,}, //³⁄₈
{6, −32, 154, 154, −32, 6,}, //⁴⁄₈
{4, −26, 114, 189, −31, 6,}, //⁵⁄₈
{3, −19, 73, 220, −26, 5,}, //⁶⁄₈
{2, −11, 35, 243, −16, 3,} //⁷⁄₈

This principle of using an FIR filter only may also be applicable to a hybrid video encoder. Or in other words, a further embodiment creates a hybrid video encoder comprising a an upsampler configured to upsample a reference picture at sub-sample resolution using an FIR filter (only) formed by a combination of a B-Spline function and at least one B-Spline function derivative to obtain an upsampled version of the reference picture.

When saving the FIR coefficients using finite bit width, some taps (typically outer taps) of the filter may get quantized to 0. This fact can be exploited by using an iterative design in which the above described method can be repeated for a basis $f(x; \alpha)$ with increased support and more degrees of freedom until the necessitated number of taps in finite bit width is reached or exceeded. If for some fractional positions, the necessitated number of taps is exceeded, the outer tap values can be added to inner taps to reduce the filter length. In the final stage, it is necessitated to take care of rounding effects to maintain the filter gain equal to the case without coefficient quantization.

In an embodiment, the outer tap addition or rounding can be used to generate coefficients which are simpler in binary representation, so as to enable an easier implementation using shifts and adds.

Figure 11:
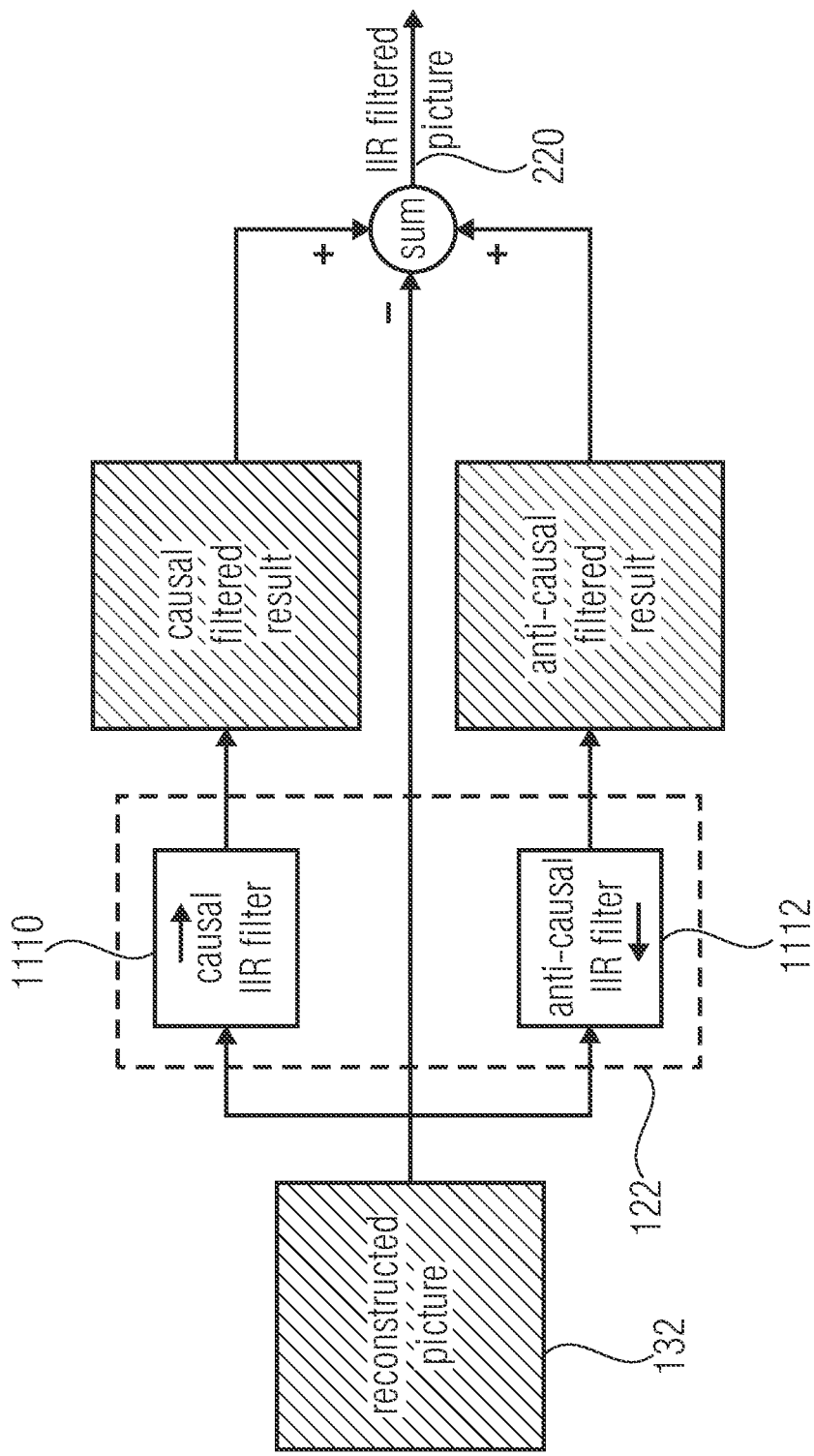
FIG. 11 shows a block diagram of a possible implementation of an IIR filter, which may be used in embodiments of the present invention.

FIG. 11 shows in a block diagram a possible implementation of the IIR filter 122. As described before, the IIR filter 122 may comprise a causal IIR filter 1110 and an anti-causal IIR filter 1112. From FIG. 11 it can be seen that the causal IIR filter 1110 and the anti-causal IIR filter 1112 can be applied simultaneously to the reference picture (or reconstructed picture) 132 to achieve a causal filtered result and an anti-causal filtered result. The causal filtered result and the anti-causal filtered result may be combined with the unfiltered reference picture 132, to derive the IIR filtered version 220 of the reference picture 132 (also designated as IIR filtered picture 220). As can be seen from FIG. 11, the causal filtered result and the anti-causal filtered result may be summed and the reference picture 132 may get subtracted from the result of the summing of the causal filtered result and the anti-causal filtered result.

According to further embodiments, the causal IIR filter 1110 and the anti-causal IIR filter 1112 may be applied to the reference picture 132 in a first step in a first direction (e.g., a horizontal direction) and in a second step in a second direction of the reference picture 132 (e.g., a vertical direction). Or in other words, the causal IIR filter 1110 and the anti-causal IIR filter 1112 may be one dimensional filter.

Furthermore, the causal IIR filter and the anti-causal IIR filter are independent from each other, i.e., they both work on the reference picture 132.

Compared to systems in which a reconstructed picture is filtered first causal and afterwards anti-causal, in which errors due to the final position in the causal filtering stage are further magnified by the errors during the anti-causal filtering stage, this problem due to the finite precisions are restricted because the causal filter 1110 and the anti-causal filter 1112 shown in FIG. 11 do not operate in a sequential manner, but in a parallel manner. Furthermore, the anti-causal filter 1112 does not have to wait for the causal filter 1110 to finish, therefore, the latency of the entire IIR filtering decreases compared to systems in which a sequential causal filtering and IIR filtering is performed.

The implementation of the IIR filter shown in FIG. 122 has the advantage of limiting the computation errors when implementing using finite arithmetic precision.

A one-dimensional transfer function of the IIR filter 122 may be chosen as:

$$H(z) = g \cdot \left( \frac{1}{1 - p \cdot z^{-1}} + \frac{1}{1 - p \cdot z} - 1 \right),$$

wherein g denotes a normalization factor, p denotes a parameter and z denotes the z transfer variable.

According to further embodiments, the FIR filter kernel may K of the FIR filter 124 may be chosen to be equal or proportional to $$\begin{pmatrix} 1820 & 4552 & 1820 & 0 \\ 32 & 134 & 86 & 4 \\ 14 & 114 & 114 & 14 \\ 4 & 86 & 134 & 32 \end{pmatrix}.$$

Functionalities and aspects described herein in conjunction with a hybrid video decoder may also apply to a hybrid video encoder and vice versa.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A hybrid video decoder, comprising:
an extractor circuit that extracts motion information and residual information for a first block of a current picture from a data stream, the motion information being defined at a sub-sample resolution;
a predictor circuit that provides, depending on the motion information for the first block of the current picture, a prediction for the first block of the current picture by interpolating a reference picture, using a combination of an IIR filter and FIR filter; and
a reconstructor circuit that reconstructs the current picture at the first block using the prediction and the residual information for the first block of the current picture; wherein
the predictor circuit interpolates the reference picture such that the reference picture is spatially filtered with the IIR filter to acquire an IIR filtered version of the reference picture, the IIR filtered version of the reference picture having a sample resolution equal to a sample resolution of the reference picture; and
the FIR filter is applied to the IIR filtered version of the reference picture to acquire the prediction for the first block of the current picture, by interpolating the IIR filtered version of the reference picture at a subset of sub-sample positions determined by the motion information.

2. The hybrid video decoder according to claim 1, wherein the predictor circuit, in providing a prediction for another block of the current picture, depending on a further motion information for the other block of the current picture, selectively applies the FIR filter to the IIR filtered version of the reference picture anew, depending on the further motion information, to interpolate the IIR filtered version of the reference picture at a further subset of upsampled sample positions, determined by the further motion information.

3. The hybrid video decoder according to claim 2, wherein the further subset at least partially overlaps with the subset of upsampled sample positions determined by the motion information for the first block of the current picture.

4. The hybrid video decoder according to claim 2, wherein the predictor circuit is configured to spatially filter the reference picture with the IIR filter by row and/or column-wise causal and anti-causal filtering across portions of the IIR filtered version of the reference picture covering the first and second subset of upsampled sample positions so that every sample within the portions of the IIR filtered version of the reference picture depends, via the row and/or column-wise causal and anti-causal filtering, on all samples of the reference picture lying within the portions of the IIR filtered version of the reference picture.

5. The hybrid video decoder according to claim 4, wherein the further subset is non-overlapping with respect to the subset of upsampled sample positions determined by the motion information for the first block of the current picture.

6. The hybrid video decoder according to claim 1,
wherein the extractor circuit extracts IIR filter information for the first block of the current picture from the data stream, and
wherein the predictor circuit adapts the IIR filter using the IIR filter information.

7. The hybrid video decoder according to claim 6,
wherein the predictor circuit comprises a memory, with at least two different filter parameters for the IIR filter, stored in the memory; and
wherein the predictor circuit selects one out of the at least two different filter parameters, stored in the memory, depending on the IIR filter information, to adapt the IIR filter, based on the selected filter parameter.

8. The hybrid video decoder according to claim 6,
wherein the IIR information indicates a pole zero value of a transfer function of the IIR filter, and wherein the predictor is configured to adapt the IIR filter by inserting the pole zero value into a parameterization of the IIR filter.

9. The hybrid video decoder according to claim 1,
wherein, in the predictor circuit, the IIR filter comprises a concatenation of a first one dimensional IIR filter along a first direction and of a second one dimensional IIR filter along a second direction.

10. The hybrid video decoder according to claim 9,
wherein, in the predictor circuit, the first one dimensional IIR filter is equal to the second one dimensional IIR filter.

11. The hybrid video decoder according to claim 9,
wherein, in the predictor circuit, a one dimensional transfer function of the first one dimensional IIR filter and/or of the second one dimensional IIR filter is based on a first order causal IIR filter and on a first order anti-causal IIR filter.

12. The hybrid video decoder according to claim 1,
wherein the IIR filter comprises a causal IIR filter and an anti causal IIR filter; and
wherein the predictor is configured to simultaneously apply the causal IIR filter and the anti causal IIR filter to the reference picture.

13. The hybrid video decoder according to claim 1,
wherein, in the predictor circuit, the FIR filter is a 4-tap FIR filter.

14. The hybrid video decoder according to claim 1,
wherein a pole value p of the IIR filter chosen to be $$p = -2^{-N_1} - 2^{-N_2} \ldots - 2^{-N_m};$$

wherein $N_1 > N_2 > \ldots > N_m$;
wherein $N_1, N_2, \ldots, N_m$ are natural numbers larger than 0;

wherein a filter parameter of the FIR filter is chosen such that deviations of IIR filtered values at full pixel positions of the reference picture compared to their associated values in the reference picture before interpolating are reduced by the FIR filter at least by 50%.

15. The hybrid video decoder according to claim 14, wherein the pole value p of the IIR filter is chosen to be $$p=-2^{-N},$$

wherein N is a natural number larger than 0.

16. The hybrid video decoder according to claim 14, wherein the filter parameter of the FIR filter is a basis function of the FIR filter, wherein the basis function is chosen such that the basis function reduces the deviation of the IIR filtered values at the full pixel positions of the reference picture to zero.

17. The hybrid video decoder according to claim 14, wherein the filter parameter of the FIR filter is acquired by sampling a basis function, wherein the basis function is chosen such that the FIR filtering of the IIR filtered values using the samples at full pixel positions of the basis function reduces the deviation of the resulting values at the full pixel positions of the reference picture to zero.

18. The hybrid video decoder according to claim 14, wherein a basis function of the FIR filter is a combination of a B-Spline function and a B-Spline function derivative.

19. The hybrid video decoder according to claim 14, wherein the pole value of the IIR filter is −0.5.

20. The hybrid video decoder according to claim 14, wherein the IIR filter is implemented multiplication-free using shift operations and add operations only.

21. The hybrid video decoder according to claim 1, wherein the FIR filter is formed by a combination of a B-Spline function and at least one B-Spline function derivative.

22. The hybrid video decoder according to claim 1, wherein the predictor circuit comprises an upsampler for performing an upsampling of the reference picture using the combination of the IIR filter and the FIR filter to determine an upsampled reference picture, and wherein the predictor circuit further comprises a motion compensation block for applying the motion information to the upsampled reference picture to determine the prediction for the first block of the current picture.

23. A hybrid video decoder, comprising:
an extractor circuit that extracts motion information and residual information for a first block of a current picture from a data stream;
a predictor circuit that provides, depending on the motion information for the first block of the current picture, a prediction for the first block of the current picture by interpolating a reference picture, using a combination of an IIR filter and FIR filter; and
a reconstructor circuit that reconstructs the current picture at the first block using the prediction and the residual information for the first block of the current picture;
wherein, in the predictor circuit, the IIR filter comprises a concatenation of a first one dimensional IIR filter along a first direction and of a second one dimensional IIR filter along a second direction;
wherein, in the predictor circuit, a one dimensional transfer function of the first one dimensional IIR filter and/or of the second one dimensional IIR filter is based on a first order causal IIR filter and on a first order anti-causal IIR filter;

wherein the one dimensional transfer function is defined as $$H(z) = g \cdot \left(\frac{1}{1-z_1 z^{-1}}\right)\left(\frac{-z_1}{1-z_1 z}\right),$$

and
wherein g denotes a normalization factor, $z_1$ denotes a parameter and z denotes the z transfer variable.

24. A hybrid video decoder, comprising:
an extractor circuit that extracts motion information and residual information for a first block of a current picture from a data stream;
a predictor circuit that provides, depending on the motion information for the first block of the current picture, a prediction for the first block of the current picture by interpolating a reference picture, using a combination of an IIR filter and FIR filter; and
a reconstructor circuit that reconstructs the current picture at the first block using the prediction and the residual information for the first block of the current picture;
wherein, in the predictor circuit, the IIR filter comprises a concatenation of a first one dimensional IIR filter along a first direction and of a second one dimensional IIR filter along a second direction;
wherein, in the predictor circuit, a one dimensional transfer function of the first one dimensional IIR filter and/or of the second one dimensional IIR filter is based on a first order causal IIR filter and on a first order anti-causal IIR filter;
wherein the one dimensional transfer function is defined as $$H(z) = g \cdot \left(\frac{1}{1-p \cdot z^{-1}} + \frac{1}{1-p \cdot z} - 1\right),$$

and
wherein g denotes a normalization factor, p denotes a parameter and z denotes the z transfer variable.

25. A hybrid video decoder, comprising:
an extractor circuit that extracts motion information and residual information for a first block of a current picture from a data stream;
a predictor circuit that provides, depending on the motion information for the first block of the current picture, a prediction for the first block of the current picture by interpolating a reference picture, using a combination of an IIR filter and FIR filter; and
a reconstructor circuit that reconstructs the current picture at the first block using the prediction and the residual information for the first block of the current picture;
wherein the FIR filter is determined by an FIR filter kernel $\underline{K}$ proportional to $$\begin{pmatrix} 6242 & 20284 & 6242 & 0 \\ 2889 & 19079 & 10520 & 280 \\ 1073 & 15311 & 15311 & 1073 \\ 280 & 10520 & 19079 & 2889 \end{pmatrix} \text{ or } \begin{pmatrix} 1820 & 4552 & 1820 & 0 \\ 32 & 134 & 86 & 4 \\ 14 & 114 & 114 & 14 \\ 4 & 86 & 134 & 32 \end{pmatrix},$$

wherein the FIR filter comprises applying the FIR filter kernel $\underline{K}$ to a one dimensional vector according to $$\begin{pmatrix} G' \\ a \\ b \\ c \end{pmatrix} = K \cdot \begin{pmatrix} F \\ G \\ H \\ I \end{pmatrix},$$

and wherein F G H I are sample positions of the IIR filtered version of the reference picture, a b c are sub-sample positions lying between G and H and G' is an FIR filtered sample at G.

26. A hybrid video encoder, comprising:
an upsampler circuit that upsampler a reference picture at sub-sample resolution using a combination of an IIR filter and an FIR filter to acquire an upsampled version of the reference picture;
a predictor circuit that determines a motion compensated prediction for a first block of a current picture, corresponding to a motion information for the first block of the current picture, using the upsampled version of the reference picture, the motion information being defined at a sub-sample resolution;
a residual information determiner circuit that determines a residual information for the first block of the current picture using the motion compensated prediction for the first block of the current picture and the block of the current picture; and
a data stream inserter circuit that inserts the motion information and the residual information for the first block of the current picture into a data stream;
wherein, in the upsampler circuit, the reference picture is spatially IIR filtered with the IIR filter to determine an IIR filtered version of the reference picture, the IIR filtered version of the reference picture having a sample resolution equal to a sample resolution of the reference picture; and
wherein the FIR filter is applied block-wise at a first block of the IIR filtered version of the reference picture, a block size of the first block of the IIR filtered version of the reference picture being determined by a search area of the motion information for the first block of the current picture, to acquire an upsampled version of the first block of the IIR filtered version of the reference picture;
wherein, in providing a prediction for another block of the current picture, depending on a further motion information for the other block of the current picture, the upsampler circuit block-wise applies the FIR filter at a further block of the IIR filtered version of the reference picture anew, depending on the further motion information, a block size of the further block being determined by a search area of the further motion information, to acquire an upsampled version of the further block of the IIR filtered version of the reference picture; and
wherein the further block of the IIR filtered version of the reference picture, at least partially, overlaps with the first block of the IIR filtered version of the reference picture.

27. The hybrid video encoder according to claim 26, further comprising a reconstructor circuit that acquires the reference picture as a reconstructed version of a previously encoded picture.

28. The hybrid video encoder according to claim 26,
wherein the predictor circuit determines a preliminary motion information for the first block of the current picture based on a preliminary upsampled version of the reference picture;
wherein the upsampler circuit determines an IIR filter information for the first block of the current picture based on the preliminary motion information for the first block of the current picture and to adapt the IIR filter based on the IIR filter information; and
wherein the data stream inserter circuit inserts the IIR filter information into the data stream.

29. The hybrid video encoder according to claim 26, wherein a pole value p of the IIR filter is chosen to be $$p = -2^{-N_1} - 2^{-N_2} \ldots -2^{-M_m};$$

wherein $N_1 > N_2 > \ldots > N_m$;
wherein $N_1, N_2, \ldots, N_m$ are natural numbers larger than 0;
wherein a filter parameter of the FIR filter is chosen such that deviations of IIR filtered values at full pixel positions of the reference picture compared to their associated values in the reference picture before interpolating are reduced by the FIR filter at least by 50%.

30. The hybrid video encoder according to claim 26, wherein the FIR filter is formed by a combination of a B-Spline function and at least one B-Spline function derivative.

31. The hybrid video encoder according to claim 26, wherein the predictor circuit is configured to spatially IIR filter the reference picture with the IIR filter by row and/or column-wise causal and anti-causal filtering across portions of the IIR filtered version of the reference picture covering the first and second subset of upsampled sample positions so that every sample within the portions of the IIR filtered version of the reference picture depends, via the row and/or column-wise causal and anti-causal filtering, on all samples of the reference picture lying within the portions of the IIR filtered version of the reference picture.

32. The hybrid video decoder according to claim 31, wherein the further block of the IIR filtered version of the reference picture at least partially overlaps with the first block of the IIR filtered version of the reference picture such that there is a portion of the further block not overlapped by the first block and a portion of the first block not overlapped by the further block.

33. A method for decoding a video comprising:
extracting motion information and residual information for a block of a current picture from a data stream, the motion information being defined at a sub-sample resolution;
providing, depending on the motion information, a prediction for the block of the current picture by interpolating a reference picture, using a combination of an IIR filter and FIR filter; and
reconstructing the current picture at the block using the prediction for the block and the residual information for the block; wherein
the providing includes interpolating the reference picture such that the reference picture is spatially filtered with the IIR filter to acquire an IIR filtered version of the reference picture, the IIR filtered version of the reference picture having a sample resolution equal to a sample resolution of the reference picture; and
the FIR filter is applied to the IIR filtered version of the reference picture to acquire the prediction for the first block of the current picture, by interpolating the HR filtered version of the reference picture at a subset of sub-sample positions determined by the motion information.

34. The method according to claim 33,
wherein a pole value p of the IIR filter is chosen to be $$p = -2^{-N_1} - 2^{-N_2} \ldots 2^{-N_m};$$

wherein $N_1 > N_2 > \ldots > N_m$;
wherein $N_1, N_2, \ldots, N_m$ are natural numbers larger than 0;
wherein a filter parameter of the FIR filter is chosen such that deviations of IIR filtered values at full pixel positions of the reference picture compared to their associated values in the reference picture before interpolating are reduced by the FIR filter at least by 50%.

35. The method according to claim 33,
wherein the FIR filter is formed by a combination of a B-Spline function and at least one B-Spline function derivative.

36. The method for decoding a video according to claim 33, wherein providing, depending on the motion information, a prediction for the block of the current picture by interpolating a reference picture, using a combination of an IIR filter and FIR filter, is performed by upsampling the reference picture using the combination of the IIR filter and the FIR filter to determine an upsampled reference picture and by applying the motion information to the upsampled reference picture to determine the prediction for the first block of the current picture.

37. The method according to claim 33, further comprising providing a prediction for another block of the current picture, depending on a further motion information for the other block of the current picture, by selectively applying the FIR filter to the IIR filtered version of the reference picture anew, depending on the further motion information, to interpolate the IIR filtered version of the reference picture at a further subset of upsampled sample positions, determined by the further motion information.

38. The method according to claim 37, wherein the reference picture is spatially filtered with the IIR filter by row and/or column-wise causal and anti-causal filtering across portions of the IIR filtered version of the reference picture covering the first and second subset of upsampled sample positions so that every sample within the portions of the IIR filtered version of the reference picture depends, via the row and/or column-wise causal and anti-causal filtering, on all samples of the reference picture lying within the portions of the IIR filtered version of the reference picture.

39. The method according to claim 38, wherein the further subset is non-overlapping with respect to the subset of upsampled sample positions determined by the motion information for the first block of the current picture.

40. A method for encoding a video comprising:
upsampling a reference picture at sub-pixel resolution, using a combination of an IIR filter and FIR filter to acquire an upsampled version of the reference picture;
determining a motion compensated prediction for a block of a current picture, corresponding to a motion information for the block of the current picture, using the upsampled version of the reference picture, the motion information being defined at a sub-sample resolution;
determining a residual information for the block of the current picture using the motion compensated prediction for the block of the current picture and the block of the current picture; and
inserting the motion information and the residual information for the block of the current picture into a data stream;
wherein the upsampling is performed such that the reference picture is spatially IIR filtered with the IIR filter to determine an IIR filtered version of the reference picture, the HR filtered version of the reference picture having a sample resolution equal to a sample resolution of the reference picture;
wherein the FIR filter is applied block-wise at a first block of the IIR filtered version of the reference picture, a block size of the first block of the IIR filtered version of the reference picture being determined by a search area of the motion information for the first block of the current picture, to acquire an upsampled version of the first block of the IIR filtered version of the reference picture;
wherein the method further comprises providing a prediction for another block of the current picture, depending on a further motion information for the other block of the current picture, by block-wise applying the FIR filter at a further block of the IIR filtered version of the reference picture anew, depending on the further motion information, a block size of the further block being determined by a search area of the further motion information, to acquire an upsampled version of the further block of the IIR filtered version of the reference picture; and
wherein the further block of the IIR filtered version of the reference picture, at least partially, overlaps with the first block of the IIR filtered version of the reference picture.

41. The method according to claim 40,
wherein a pole value p of the IIR filter is chosen to be $$p = -2^{-N_1} - 2^{-N_2} \ldots 2^{-N_m};$$

wherein $N_1 > N_2 > \ldots > N_m$;
wherein $N_1, N_2, \ldots, N_m$ are natural numbers larger than 0;
wherein a filter parameter of the FIR filter is chosen such that deviations of IIR filtered values at full pixel positions of the reference picture compared to their associated values in the reference picture before interpolating are reduced by the FIR filter at least by 50%.

42. The method according to claim 40,
wherein the FIR filter is formed by a combination of a B-Spline function and at least one B-Spline function derivative.

43. The method according to claim 40, wherein the reference picture is spatially filtered with the IIR filter by row and/or column-wise causal and anti-causal filtering across portions of the IIR filtered version of the reference picture covering the first and second subset of upsampled sample positions so that every sample within the portions of the IIR filtered version of the reference picture depends, via the row and/or column-wise causal and anti-causal filtering, on all samples of the reference picture lying within the portions of the IIR filtered version of the reference picture.

44. The method according to claim 43, wherein the further block of the IIR filtered version of the reference picture, at least partially, overlaps with the first block of the IIR filtered version of the reference picture such that there is a portion of the further block not overlapped by the first block and portion of the first block not overlapped by the further block.

45. A non-transitory computer readable digital storage medium having stored thereon a computer program comprising a program code for performing, when running on a computer, a method for decoding a video comprising: extracting motion information and residual information for a block of a current picture from a data stream, the motion information being defined at a sub-sample resolution; providing, depending on the motion information, a prediction for the block of the current picture by interpolating a reference picture, using a combination of an IIR filter and FIR filter; and reconstructing the current picture at the block using the prediction for the block and the residual information for the block; wherein
- the providing includes interpolating the reference picture such that the reference picture is spatially filtered with the IIR filter to acquire an IIR filtered version of the reference picture, the IIR filtered version of the reference picture having a sample resolution equal to a sample resolution of the reference picture; and
- the FIR filter is applied to the IIR filtered version of the reference picture to acquire the prediction for the first block of the current picture, by interpolating the HR filtered version of the reference picture at a subset of sub-sample positions determined by the motion information.

* * * * *